US010222458B2

(12) United States Patent
Pacala et al.

(10) Patent No.: US 10,222,458 B2
(45) Date of Patent: *Mar. 5, 2019

(54) OPTICAL SYSTEM FOR COLLECTING DISTANCE INFORMATION WITHIN A FIELD

(71) Applicant: Ouster, Inc., San Francisco, CA (US)

(72) Inventors: Angus Pacala, San Francisco, CA (US); Mark Frichtl, San Francisco, CA (US); Marvin Shu, Daly City, CA (US); Eric Younge, San Francisco, CA (US)

(73) Assignee: OUSTER, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/934,613

(22) Filed: Mar. 23, 2018

(65) Prior Publication Data

US 2018/0217236 A1 Aug. 2, 2018

Related U.S. Application Data

(63) Continuation of application No. 15/685,384, filed on Aug. 24, 2017.

(Continued)

(51) Int. Cl.
*G01C 3/08* (2006.01)
*G01S 7/481* (2006.01)
(Continued)

(52) U.S. Cl.
CPC .......... *G01S 7/4816* (2013.01); *G01S 7/4817* (2013.01); *G01S 17/08* (2013.01); *G01S 17/89* (2013.01)

(58) Field of Classification Search
CPC .... G02B 27/2214; G02B 5/005; G02B 5/208; G02B 3/0056; G02B 27/46; H04N 13/218
(Continued)

(56) References Cited

U.S. PATENT DOCUMENTS

| 4,358,851 A | 11/1982 | Scifres et al. |
| 4,634,272 A | 1/1987 | Endo |

(Continued)

FOREIGN PATENT DOCUMENTS

| EP | 2124069 | 11/2009 |
| EP | 3002548 | 9/2016 |

(Continued)

OTHER PUBLICATIONS

PCT/US2017/039306 , "International Search Report and Written Opinion", dated Nov. 7, 2017, 21 pages.

(Continued)

*Primary Examiner* — Mark Hellner
(74) *Attorney, Agent, or Firm* — Kilpatrick Townsend & Stockton LLP

(57) ABSTRACT

Optical systems and methods for collecting distance information are disclosed. An example optical system includes a bulk receiving optic, a plurality of illumination sources, a pixel array comprising at least a first column of pixels and a second column of pixels, each pixel in the first column of pixels being offset from an adjacent pixel in the first column of pixels by a first pixel pitch, the second column of pixels being horizontally offset from the first column of pixels by the first pixel pitch, the second column of pixels being vertically offset from the first column of pixels by a first vertical pitch; and a set of input channels interposed between the bulk receiving optic and the pixel array.

27 Claims, 15 Drawing Sheets

Related U.S. Application Data

(60) Provisional application No. 62/379,130, filed on Aug. 24, 2016.

(51) Int. Cl.
  *G01S 17/08* (2006.01)
  *G01S 17/89* (2006.01)

(58) Field of Classification Search
  USPC .......................................................... 356/4.01
  See application file for complete search history.

(56) References Cited

U.S. PATENT DOCUMENTS

| | | |
|---|---|---|
| 4,676,599 A | 6/1987 | Cruz |
| 4,702,600 A | 10/1987 | Handrich et al. |
| 4,744,667 A | 5/1988 | Fay et al. |
| 4,851,664 A | 7/1989 | Rieger |
| 5,267,016 A | 11/1993 | Meinzer et al. |
| 5,288,992 A | 2/1994 | Fohl |
| 5,982,552 A | 11/1999 | Nakama et al. |
| 6,014,232 A | 1/2000 | Clarke |
| 6,133,989 A | 10/2000 | Stettner et al. |
| 6,255,133 B1 | 7/2001 | Ormond et al. |
| 6,374,024 B1 | 4/2002 | Iijima |
| 6,414,746 B1 | 7/2002 | Stettner et al. |
| 6,690,019 B2 | 2/2004 | Stettner et al. |
| 6,721,262 B1 | 4/2004 | Jordache et al. |
| 7,091,462 B2 | 8/2006 | Wilson et al. |
| D531,525 S | 11/2006 | Dold et al. |
| 7,170,542 B2 | 1/2007 | Hanina et al. |
| 7,295,298 B2 | 11/2007 | Willhoeft et al. |
| 7,345,271 B2 | 3/2008 | Boehlau et al. |
| 7,421,159 B2 | 9/2008 | Yang et al. |
| 7,433,042 B1 | 10/2008 | Cavanaugh et al. |
| 7,808,706 B2 | 10/2010 | Fadel et al. |
| 7,969,558 B2 | 6/2011 | Hall |
| 8,013,983 B2 | 9/2011 | Lin et al. |
| 8,089,618 B2 | 1/2012 | Yang |
| 8,130,367 B2 | 3/2012 | Stettner et al. |
| D659,030 S | 5/2012 | Anselment et al. |
| 8,319,949 B2 | 11/2012 | Cantin et al. |
| 8,330,840 B2 | 12/2012 | Lenchenkov |
| 8,374,405 B2 | 2/2013 | Lee et al. |
| 8,384,997 B2 | 2/2013 | Shpunt et al. |
| 8,494,252 B2 | 7/2013 | Freedman et al. |
| 8,675,181 B2 | 3/2014 | Hall |
| 8,717,488 B2 | 5/2014 | Shpunt et al. |
| 8,742,325 B1 | 6/2014 | Droz et al. |
| 8,743,176 B2 | 6/2014 | Stettner et al. |
| 8,761,495 B2 | 6/2014 | Freedman et al. |
| 8,767,190 B2 | 7/2014 | Hall |
| 8,829,406 B2 | 9/2014 | Akerman et al. |
| 8,836,922 B1 | 9/2014 | Pennecot et al. |
| 8,848,039 B2 | 9/2014 | Spektor et al. |
| 9,041,915 B2 | 5/2015 | Earhart et al. |
| 9,063,549 B1 | 6/2015 | Pennecot et al. |
| 9,071,763 B1 | 6/2015 | Templeton et al. |
| 9,086,273 B1 | 7/2015 | Gruver et al. |
| 9,111,444 B2 | 8/2015 | Kaganovich |
| 9,157,790 B2 | 10/2015 | Shpunt et al. |
| 9,164,511 B1 | 10/2015 | Ferguson et al. |
| 9,176,051 B2 | 11/2015 | Mappes et al. |
| 9,229,109 B2 | 1/2016 | Stettner et al. |
| 9,285,464 B2 | 3/2016 | Pennecot et al. |
| 9,285,477 B1 | 3/2016 | Smith et al. |
| 9,299,731 B1 | 3/2016 | Lenius et al. |
| 9,368,936 B1 | 6/2016 | Lenius et al. |
| 9,369,689 B1 | 6/2016 | Tran et al. |
| 9,383,753 B1 | 7/2016 | Templeton et al. |
| 9,425,654 B2 | 8/2016 | Lenius et al. |
| 9,435,891 B2 | 9/2016 | Oggier |
| 9,470,520 B2 | 10/2016 | Schwarz et al. |
| 9,489,601 B2 | 11/2016 | Fairfield et al. |
| 9,525,863 B2 | 12/2016 | Nawasra et al. |
| 9,529,079 B1 | 12/2016 | Droz et al. |
| 9,989,406 B2 | 6/2018 | Pacala |
| 9,992,477 B2 * | 6/2018 | Pacala ................ G02B 27/2214 |
| 10,063,849 B2 | 8/2018 | Pacala |
| 2003/0006676 A1 | 1/2003 | Smith et al. |
| 2003/0047752 A1 | 3/2003 | Campbell |
| 2004/0061502 A1 | 4/2004 | Hasser |
| 2004/0223071 A1 | 11/2004 | Wells |
| 2005/0030409 A1 | 2/2005 | Matherson |
| 2006/0244851 A1 | 11/2006 | Cartlidge |
| 2007/0007563 A1 | 1/2007 | Mouli |
| 2007/0060806 A1 | 3/2007 | Hunter et al. |
| 2007/0071056 A1 * | 3/2007 | Chen ................... G01S 7/4814 372/50.124 |
| 2007/0228262 A1 | 10/2007 | Cantin et al. |
| 2008/0121826 A1 * | 5/2008 | Manley ............... G02B 3/0056 250/551 |
| 2008/0153189 A1 | 6/2008 | Plaine |
| 2009/0016642 A1 | 1/2009 | Hart |
| 2009/0040629 A1 | 2/2009 | Bechtel |
| 2009/0179142 A1 | 7/2009 | Duparre et al. |
| 2009/0295910 A1 | 12/2009 | Mir et al. |
| 2010/0008588 A1 | 1/2010 | Feldkhun et al. |
| 2010/0020306 A1 | 1/2010 | Hall |
| 2010/0110275 A1 | 5/2010 | Mathieu |
| 2010/0123893 A1 | 5/2010 | Yang |
| 2010/0204964 A1 | 8/2010 | Pack et al. |
| 2011/0025843 A1 | 2/2011 | Oggier et al. |
| 2011/0032398 A1 | 2/2011 | Lenchenkov |
| 2011/0037849 A1 | 2/2011 | Niclass |
| 2011/0116262 A1 | 5/2011 | Marson |
| 2011/0216304 A1 | 9/2011 | Hall |
| 2012/0044476 A1 | 2/2012 | Earhart et al. |
| 2012/0140109 A1 | 6/2012 | Shpunt et al. |
| 2012/0154914 A1 | 6/2012 | Moriguchi et al. |
| 2012/0182464 A1 | 7/2012 | Shpunt et al. |
| 2012/0287417 A1 | 11/2012 | Mimeault |
| 2012/0320164 A1 | 12/2012 | Lipton |
| 2013/0044310 A1 | 2/2013 | Mimeault |
| 2013/0141549 A1 | 6/2013 | Beers et al. |
| 2013/0206967 A1 | 8/2013 | Shpunt et al. |
| 2013/0294089 A1 | 11/2013 | Freedman et al. |
| 2013/0300840 A1 | 11/2013 | Borowski |
| 2014/0118335 A1 | 5/2014 | Gurman |
| 2014/0118493 A1 | 5/2014 | Sali et al. |
| 2014/0153001 A1 | 6/2014 | Chayat et al. |
| 2014/0158900 A1 | 6/2014 | Yoon et al. |
| 2014/0168631 A1 | 6/2014 | Haslim et al. |
| 2014/0176933 A1 | 6/2014 | Haslim et al. |
| 2014/0211194 A1 | 7/2014 | Pacala et al. |
| 2014/0269796 A1 | 9/2014 | Geske et al. |
| 2014/0285628 A1 | 9/2014 | Shpunt et al. |
| 2014/0291491 A1 | 10/2014 | Shpunt et al. |
| 2014/0313519 A1 | 10/2014 | Shpunt et al. |
| 2014/0375977 A1 | 12/2014 | Ludwig et al. |
| 2014/0376092 A1 | 12/2014 | Mor |
| 2015/0002636 A1 | 1/2015 | Brown |
| 2015/0131080 A1 | 5/2015 | Retterath et al. |
| 2015/0184999 A1 | 7/2015 | Stettner |
| 2015/0192677 A1 | 7/2015 | Yu et al. |
| 2015/0292948 A1 | 10/2015 | Goldring et al. |
| 2015/0293224 A1 | 10/2015 | Eldada et al. |
| 2015/0316473 A1 | 11/2015 | Kester et al. |
| 2015/0355470 A1 | 12/2015 | Herschbach |
| 2015/0358601 A1 | 12/2015 | Oggier |
| 2015/0378241 A1 | 12/2015 | Eldada |
| 2015/0379371 A1 | 12/2015 | Yoon et al. |
| 2016/0003946 A1 | 1/2016 | Gilliland et al. |
| 2016/0047895 A1 | 2/2016 | Dussan |
| 2016/0047896 A1 | 2/2016 | Dussan |
| 2016/0047897 A1 | 2/2016 | Dussan |
| 2016/0047898 A1 | 2/2016 | Dussan |
| 2016/0047899 A1 | 2/2016 | Dussan |
| 2016/0047900 A1 | 2/2016 | Dussan |
| 2016/0047901 A1 | 2/2016 | Pacala et al. |
| 2016/0047903 A1 | 2/2016 | Dussan |
| 2016/0049765 A1 | 2/2016 | Eldada |
| 2016/0097858 A1 | 4/2016 | Mundhenk et al. |
| 2016/0150963 A1 | 6/2016 | Roukes et al. |

(56) References Cited

U.S. PATENT DOCUMENTS

| | | | |
|---|---|---|---|
| 2016/0161600 | A1 | 6/2016 | Eldada et al. |
| 2016/0218727 | A1 | 7/2016 | Maki |
| 2016/0265902 | A1 | 9/2016 | Nawasra et al. |
| 2016/0291134 | A1 | 10/2016 | Droz et al. |
| 2016/0306032 | A1 | 10/2016 | Schwarz et al. |
| 2016/0327779 | A1 | 11/2016 | Hillman |
| 2016/0328619 | A1 | 11/2016 | Yi et al. |
| 2017/0146640 | A1 | 5/2017 | Hall et al. |
| 2017/0219426 | A1 | 8/2017 | Pacala et al. |
| 2017/0219695 | A1 | 8/2017 | Hall et al. |
| 2017/0269197 | A1 | 9/2017 | Hall et al. |
| 2017/0269198 | A1 | 9/2017 | Hall et al. |
| 2017/0269215 | A1* | 9/2017 | Hall .................... G01S 7/4811 |
| 2017/0289524 | A1 | 10/2017 | Pacala et al. |
| 2017/0350983 | A1 | 12/2017 | Hall et al. |
| 2018/0059222 | A1 | 3/2018 | Pacala |
| 2018/0152691 | A1 | 5/2018 | Pacala |
| 2018/0209841 | A1 | 7/2018 | Pacala |
| 2018/0267143 | A1 | 9/2018 | Alcalde et al. |

FOREIGN PATENT DOCUMENTS

| | | |
|---|---|---|
| JP | H3-6407 | 1/1991 |
| JP | 07049417 | 2/1995 |
| WO | 2015052616 | 4/2015 |
| WO | 2016116733 | 7/2016 |
| WO | 2016125165 | 8/2016 |
| WO | 2017132704 | 8/2017 |
| WO | 2018039432 | 3/2018 |

OTHER PUBLICATIONS

PCT/US2017/039306, "Invitation to Pay Add'l Fees and Partial Search Report", dated Aug. 31, 2017, 2 pages.
PCT/US2017/048379, "International Search Report and Written Opinion", dated Nov. 2, 2017, 12 pages.
Non-Final Office Action dated Jul. 28, 2017 in U.S. Appl. No. 15/419,053, filed Jan. 30, 2017, 26 pages.
Velodyne Lidar, Inc., HDL-32E Data Sheet 2010, 2017.
Velodyne Lidar, Inc., HDL-32E, User's Manual 2010.; Aug. 2016.
Velodyne Lidar, Inc., HDL-32E, HDL-32E, webpage: http://www.velodynelidar.com/hdl-32e.html; retrieved Dec. 6, 2017.
Velodyne Lidar, Inc., HDL-64E Data Sheet, 2017.
Velodyne Lidar, Inc., HDL-64E S2 and S2.1; User's Manual and Programming Guide 2007; Firmware version 4; 2007, revision Nov. 2012.
Velodyne Lidar, Inc., HDL-64E, S3; User's Manual and Programming Guide revision J; 2007.; Dec. 2017.
Velodyne Lidar, Inc., HDL-64E; webpage: http://www.velodynelidar.com/hdl-64e.html; retrieved Dec. 6, 2017.
Velodyne Lidar, Inc., VLP-16 data sheet, Puck, Real Time 3D Lidar Sensor, 2014.
Velodyne Lidar Inc., Velodyne Lidar Puck; User's Manual and Programming Guide; 2014.
Velodyne Lidar, Inc., VLP-16; 2017. retrieved via website: http://www.velodynelidar.com/vlp-16.html; Dec. 6, 2017.
Velodyne, Lidar, Inc.; Puck Hi-Res Data Sheet; Sep. 2016.
Velodyne Lidar, Inc.; Puck Hi-Res User Manual; Sep. 2016.
Velodyne Lidar, Inc.; Puck Hi-Res retrieved via website: http://www.velodynelidar.com/vlp-16-hi-res.html; Dec. 13, 2017.
Velodyne Lidar, Inc.; Puck Lite Data Sheet; Feb. 2016.
Velodyne Lidar, Inc.; Puck Lite User Manual; Feb. 2016.
Velodyne Lidar, Inc.; Puck Lite, Our Lightest Sensor Ever, Apr. 2016; retrieved via website: http://www.velodynelidar.com/vlp-16-lite.html; Dec. 13, 2017.
Velodyne Lidar, Inc.,; Ultra Puck VLP-32C; Nov. 2017; retrieved via website: http://www.velodynelidar.com/vlp-32c.html; Dec. 13, 2017.
Bronzi, Danilo, "100 000 Frames/s 64×32 Single Photon Detector Array for 2-D Imaging and 3-D Ranging", IEEE Journal of Selected Topic in Quantum Electronics, vol. 20, No. 6, Nov./Dec. 2014; 10 pages.
Quanergy Systems EX, 1005, Review of Scientific Instruments; vol. 72, No. 4, Apr. 2001, 13 pages.
Itzler, Mark A. "Geiger-mode avalance photodiode focal plane arrays for three-dimensional imaging LADAR"; Princeton Llghtwave, Inc., Proc of SPIE vol. 7808 780890C-, 14 pages.
Cova, Sergio D.; Single-Photon Counting Detectors, IEEE Photonics Journal; vol. 3, No. 2, Apr. 2011, 5 pages.
Guerrieri, Fabrizio, Two-Dimensional SPAD Imaging Camera for Photon Counting, vol. 2, No. 5, Oct. 2010, 17 pages.
Charbon, Edoardo, et al. "SPAD-Based Sensors"; TOF Range-Imaging Cameras, Remondino, F. ; Stoppa, D. (Eds.), 2013, V, 240 p. 138 Illus., 85 illus. In color., Hardcover ISBN: 978-3-642-27522-7.

* cited by examiner

Nominal Matrix @ 0° arcuate sampling position:

| d(1,1) @0° | d(1,2) @0° | d(1,3) @0° | d(1,4) @0° |
| d(2,1) @0° | d(2,2) @0° | d(2,3) @0° | d(2,4) @0° |
| d(3,1) @0° | d(3,2) @0° | d(3,3) @0° | d(3,4) @0° |
| d(4,1) @0° | d(4,2) @0° | d(4,3) @0° | d(4,4) @0° |
| d(5,1) @0° | d(5,2) @0° | d(5,3) @0° | d(5,4) @0° |
| d(6,1) @0° | d(6,2) @0° | d(6,3) @0° | d(6,4) @0° |
| d(7,1) @0° | d(7,2) @0° | d(7,3) @0° | d(7,4) @0° |
| d(8,1) @0° | d(8,2) @0° | d(8,3) @0° | d(8,4) @0° |
| d(9,1) @0° | d(9,2) @0° | | |

Nominal Matrix @ .176° arcuate sampling position:

| | | | | | |
|---|---|---|---|---|---|
| d(1,1) @0° | d(1,1) @.176°<br>d(1,2) @0° | d(1,2) @.176°<br>d(1,3) @0° | d(1,3) @.176°<br>d(1,4) @0° | d(1,4) @.176° | ⋮ |
| d(2,1) @0° | d(2,1) @.176°<br>d(2,2) @0° | d(2,2) @.176°<br>d(2,3) @0° | d(2,3) @.176°<br>d(2,4) @0° | d(2,4) @.176° | |
| d(3,1) @0° | d(3,1) @.176°<br>d(3,2) @0° | d(3,2) @.176°<br>d(3,3) @0° | d(3,3) @.176°<br>d(3,4) @0° | d(3,4) @.176° | |
| d(4,1) @0° | d(4,1) @.176°<br>d(4,2) @0° | d(4,2) @.176°<br>d(4,3) @0° | d(4,3) @.176°<br>d(4,4) @0° | d(4,4) @.176° | |
| d(5,1) @0° | d(5,1) @.176°<br>d(5,2) @0° | d(5,2) @.176°<br>d(5,3) @0° | d(5,3) @.176°<br>d(5,4) @0° | d(5,4) @.176° | |
| d(6,1) @0° | d(6,1) @.176°<br>d(6,2) @0° | d(6,2) @.176°<br>d(6,3) @0° | d(6,3) @.176°<br>d(6,4) @0° | d(6,4) @.176° | |

Nominal Matrix @ .352° arcuate sampling position:

| | | | | | |
|---|---|---|---|---|---|
| d(1,1) @0° | d(1,1) @.176° | d(1,1) @.352° | | | |
| --- | d(1,2) @0° | d(1,2) @.176° | d(1,2) @.352° | | |
| --- | --- | d(1,3) @0° | d(1,3) @.176° | d(1,3) @.352° | |
| --- | --- | --- | d(1,4) @0° | d(1,4) @.176° | d(1,4) @.352° |
| d(2,1) @0° | d(2,1) @.176° | d(2,1) @.352° | | | |
| --- | d(2,2) @0° | d(2,2) @.176° | d(2,2) @.352° | | |
| --- | --- | d(2,3) @0° | d(2,3) @.176° | d(2,3) @.352° | |
| --- | --- | --- | d(2,4) @0° | d(2,4) @.176° | d(2,4) @.352° |
| d(3,1) @0° | d(3,1) @.176° | d(3,1) @.352° | | | |
| --- | d(3,2) @0° | d(3,2) @.176° | d(3,2) @.352° | | |
| --- | --- | d(3,3) @0° | d(3,3) @.176° | d(3,3) @.352° | |
| --- | --- | --- | d(3,4) @0° | d(3,4) @.176° | d(3,4) @.352° |
| d(4,1) @0° | d(4,1) @.176° | d(4,1) @.352° | | | |
| --- | d(4,2) @0° | d(4,2) @.176° | d(4,2) @.352° | | |
| --- | --- | d(4,3) @0° | d(4,3) @.176° | d(4,3) @.352° | |
| --- | --- | --- | d(4,4) @0° | d(4,4) @.176° | d(4,4) @.352° |
| d(5,1) @0° | d(5,1) @.176° | d(5,1) @.352° | | | |
| --- | d(5,2) @0° | d(5,2) @.176° | d(5,2) @.352° | | |
| --- | --- | d(5,3) @0° | d(5,3) @.176° | d(5,3) @.352° | |
| --- | --- | --- | d(5,4) @0° | d(5,4) @.176° | d(5,4) @.352° |
| d(6,1) @0° | d(6,1) @.176° | d(6,1) @.352° | | | |
| --- | d(6,2) @0° | d(6,2) @.176° | d(6,2) @.352° | | |
| --- | --- | d(6,3) @0° | d(6,3) @.176° | d(6,3) @.352° | |
| --- | --- | --- | d(6,4) @0° | d(6,4) @.176° | d(6,4) @.352° |
| d(7,1) @0° | d(7,1) @.176° | d(7,1) @.352° | | | |
| --- | d(7,2) @0° | d(7,2) @.176° | d(7,2) @.352° | | |
| --- | --- | d(7,3) @0° | d(7,3) @.176° | d(7,3) @.352° | |
| --- | --- | --- | d(7,4) @0° | d(7,4) @.176° | d(7,4) @.352° |

| d(8,1) @0° | d(8,1) @.176°<br>d(8,2) @0° | d(8,1) @.352°<br>d(8,2) @.176°<br>d(8,3) @0° | d(8,2) @.352°<br>d(8,3) @.176°<br>d(8,4) @0° | d(8,3) @.352°<br>d(8,4) @.176° | d(8,4) @.352° | -- | -- | ⋮ |
| -- | -- | -- | -- | -- | -- | -- | -- | |
| d(9,1) @0° | d(9,1) @.176°<br>d(9,2) @0° | d(9,1) @.352°<br>d(9,2) @.176°<br>d(9,3) @0° | d(9,2) @.352°<br>d(9,3) @.176°<br>d(9,4) @0° | d(9,3) @.352°<br>d(9,4) @.176° | d(9,4) @.352° | -- | -- | |
| d(10,1) @0° | d(10,1) @.176°<br>d(10,2) @0° | d(10,1) @.352°<br>d(10,2) @.176°<br>d(10,3) @0° | d(10,2) @.352°<br>d(10,3) @.176°<br>d(10,4) @0° | d(10,3) @.352°<br>d(10,4) @.176° | d(10,4) @.352° | -- | -- | |
| d(11,1) @0° | d(11,1) @.176°<br>d(11,2) @0° | d(11,1) @.352°<br>d(11,2) @.176°<br>d(11,3) @0° | d(11,2) @.352°<br>d(11,3) @.176°<br>d(11,4) @0° | d(11,3) @.352°<br>d(11,4) @.176° | d(11,4) @.352° | -- | -- | |
| d(12,1) @0° | d(12,1) @.176°<br>d(12,2) @0° | d(12,1) @.352°<br>d(12,2) @.176°<br>d(12,3) @0° | d(12,2) @.352°<br>d(12,3) @.176°<br>d(12,4) @0° | d(12,3) @.352°<br>d(12,4) @.176° | d(12,4) @.352° | -- | -- | |

⋮

| | | | | | | | | | | | | | | | |
|---|---|---|---|---|---|---|---|---|---|---|---|---|---|---|---|

| | | | | | | | | | | | | | | | |
|---|---|---|---|---|---|---|---|---|---|---|---|---|---|---|---|

| | | | | |
|---|---|---|---|---|
| d(13,1) @0° | d(13,1) @.176° | d(13,1) @.352° | | |
| | d(13,2) @0° | d(13,2) @.176° | d(13,2) @.352° | |
| | | d(13,3) @0° | d(13,3) @.176° | d(13,3) @.352° |
| | | | d(13,4) @0° | d(13,4) @.176° | d(13,4) @.352° |
| d(14,1) @0° | d(14,1) @.176° | d(14,1) @.352° | | |
| | d(14,2) @0° | d(14,2) @.176° | d(14,2) @.352° | |
| | | d(14,3) @0° | d(14,3) @.176° | d(14,3) @.352° |
| | | | d(14,4) @0° | d(14,4) @.176° | d(14,4) @.352° |
| d(15,1) @0° | d(15,1) @.176° | d(15,1) @.352° | | |
| | d(15,2) @0° | d(15,2) @.176° | d(15,2) @.352° | |
| | | d(15,3) @0° | d(15,3) @.176° | d(15,3) @.352° |
| | | | d(15,4) @0° | d(15,4) @.176° | d(15,4) @.352° |
| d(16,1) @0° | d(16,1) @.176° | d(16,1) @.352° | | |
| | d(16,2) @0° | d(16,2) @.176° | d(16,2) @.352° | |
| | | d(16,3) @0° | d(16,3) @.176° | d(16,3) @.352° |
| | | | d(16,4) @0° | d(16,4) @.176° | d(16,4) @.352° |

Nominal Matrix @ .528° arcuate sampling position:

| | | | | | | |
|---|---|---|---|---|---|---|
| d(1,1) @0° | d(1,1) @.176° | d(1,1) @.352° | d(1,1) @.528° | | | |
| --- | d(1,2) @0° | d(1,2) @.176° | d(1,2) @.352° | d(1,2) @.528° | | |
| --- | --- | d(1,3) @0° | d(1,3) @.176° | d(1,3) @.352° | d(1,3) @.528° | |
| --- | --- | --- | d(1,4) @0° | d(1,4) @.176° | d(1,4) @.352° | d(1,4) @.528° |
| d(2,1) @0° | d(2,1) @.176° | d(2,1) @.352° | d(2,1) @.528° | | | |
| --- | d(2,2) @0° | d(2,2) @.176° | d(2,2) @.352° | d(2,2) @.528° | | |
| --- | --- | d(2,3) @0° | d(2,3) @.176° | d(2,3) @.352° | d(2,3) @.528° | |
| --- | --- | --- | d(2,4) @0° | d(2,4) @.176° | d(2,4) @.352° | d(2,4) @.528° |
| d(3,1) @0° | d(3,1) @.176° | d(3,1) @.352° | d(3,1) @.528° | | | |
| --- | d(3,2) @0° | d(3,2) @.176° | d(3,2) @.352° | d(3,2) @.528° | | |
| --- | --- | d(3,3) @0° | d(3,3) @.176° | d(3,3) @.352° | d(3,3) @.528° | |
| --- | --- | --- | d(3,4) @0° | d(3,4) @.176° | d(3,4) @.352° | d(3,4) @.528° |
| d(4,1) @0° | d(4,1) @.176° | d(4,1) @.352° | d(4,1) @.528° | | | |
| --- | d(4,2) @0° | d(4,2) @.176° | d(4,2) @.352° | d(4,2) @.528° | | |
| --- | --- | d(4,3) @0° | d(4,3) @.176° | d(4,3) @.352° | d(4,3) @.528° | |
| --- | --- | --- | d(4,4) @0° | d(4,4) @.176° | d(4,4) @.352° | d(4,4) @.528° |
| d(5,1) @0° | d(5,1) @.176° | d(5,1) @.352° | d(5,1) @.528° | | | |
| --- | d(5,2) @0° | d(5,2) @.176° | d(5,2) @.352° | d(5,2) @.528° | | |
| --- | --- | d(5,3) @0° | d(5,3) @.176° | d(5,3) @.352° | d(5,3) @.528° | |
| --- | --- | --- | d(5,4) @0° | d(5,4) @.176° | d(5,4) @.352° | d(5,4) @.528° |
| d(6,1) @0° | d(6,1) @.176° | d(6,1) @.352° | d(6,1) @.528° | | | |
| --- | d(6,2) @0° | d(6,2) @.176° | d(6,2) @.352° | d(6,2) @.528° | | |
| --- | --- | d(6,3) @0° | d(6,3) @.176° | d(6,3) @.352° | d(6,3) @.528° | |
| --- | --- | --- | d(6,4) @0° | d(6,4) @.176° | d(6,4) @.352° | d(6,4) @.528° |
| d(7,1) @0° | d(7,1) @.176° | d(7,1) @.352° | d(7,1) @.528° | | | |
| --- | d(7,2) @0° | d(7,2) @.176° | d(7,2) @.352° | d(7,2) @.528° | | |
| --- | --- | d(7,3) @0° | d(7,3) @.176° | d(7,3) @.352° | d(7,3) @.528° | |
| --- | --- | --- | d(7,4) @0° | d(7,4) @.176° | d(7,4) @.352° | d(7,4) @.528° |

|   |   |   |   |   |   | ⋮ |   |
|---|---|---|---|---|---|---|---|

| | | | | | | | |
|---|---|---|---|---|---|---|---|
| | | | | | | d(8,4) @.528° | |
| | | | | d(8,3) @.528° | d(8,4) @.352° | | |
| | | | d(8,2) @.528° | d(8,3) @.352° | d(8,4) @.176° | | |
| d(8,1) @0° | d(8,1) @.176° | d(8,1) @.352° | d(8,1) @.528° | | | | |
| | d(8,2) @0° | d(8,2) @.176° | d(8,2) @.352° | | | | |
| | | d(8,3) @0° | d(8,3) @.176° | | | | |
| | | | d(8,4) @0° | | | | |
| d(9,1) @0° | d(9,1) @.176° | d(9,1) @.352° | d(9,1) @.528° | d(9,2) @.528° | | d(9,4) @.528° | |
| | d(9,2) @0° | d(9,2) @.176° | d(9,2) @.352° | d(9,3) @.352° | d(9,3) @.528° | | |
| | | d(9,3) @0° | d(9,3) @.176° | d(9,4) @.176° | d(9,4) @.352° | | |
| | | | d(9,4) @0° | | | | |
| d(10,1) @0° | d(10,1) @.176° | d(10,1) @.352° | d(10,1) @.528° | d(10,2) @.528° | d(10,3) @.528° | d(10,4) @.528° | |
| | d(10,2) @0° | d(10,2) @.176° | d(10,2) @.352° | d(10,3) @.352° | d(10,4) @.352° | | |
| | | d(10,3) @0° | d(10,3) @.176° | d(10,4) @.176° | | | |
| | | | d(10,4) @0° | | | | |
| d(11,1) @0° | d(11,1) @.176° | d(11,1) @.352° | d(11,1) @.528° | d(11,2) @.528° | d(11,3) @.528° | d(11,4) @.528° | |
| | d(11,2) @0° | d(11,2) @.176° | d(11,2) @.352° | d(11,3) @.352° | d(11,4) @.352° | | |
| | | d(11,3) @0° | d(11,3) @.176° | d(11,4) @.176° | | | |
| | | | d(11,4) @0° | | | | |
| d(12,1) @0° | d(12,1) @.176° | d(12,1) @.352° | d(12,1) @.528° | d(12,2) @.528° | d(12,3) @.528° | d(12,4) @.528° | |
| | d(12,2) @0° | d(12,2) @.176° | d(12,2) @.352° | d(12,3) @.352° | d(12,4) @.352° | | |
| | | d(12,3) @0° | d(12,3) @.176° | d(12,4) @.176° | | | |
| | | | d(12,4) @0° | | | | |

FIG. 5D2

| | | | | | ⋮ | | |
|---|---|---|---|---|---|---|---|
| d(13,1) @0° | d(13,1) @.176° | d(13,1) @.352° | d(13,1) @.528° | | | | |
| --- | d(13,2) @0° | d(13,2) @.176° | d(13,2) @.352° | d(13,2) @.528° | | | |
| --- | --- | d(13,3) @0° | d(13,3) @.176° | d(13,3) @.352° | d(13,3) @.528° | | |
| --- | --- | --- | d(13,4) @0° | d(13,4) @.176° | d(13,4) @.352° | d(13,4) @.528° | |
| d(14,1) @0° | d(14,1) @.176° | d(14,1) @.352° | d(14,1) @.528° | | | | |
| --- | d(14,2) @0° | d(14,2) @.176° | d(14,2) @.352° | d(14,2) @.528° | | | |
| --- | --- | d(14,3) @0° | d(14,3) @.176° | d(14,3) @.352° | d(14,3) @.528° | | |
| --- | --- | --- | d(14,4) @0° | d(14,4) @.176° | d(14,4) @.352° | d(14,4) @.528° | |
| d(15,1) @0° | d(15,1) @.176° | d(15,1) @.352° | d(15,1) @.528° | | | | |
| --- | d(15,2) @0° | d(15,2) @.176° | d(15,2) @.352° | d(15,2) @.528° | | | |
| --- | --- | d(15,3) @0° | d(15,3) @.176° | d(15,3) @.352° | d(15,3) @.528° | | |
| --- | --- | --- | d(15,4) @0° | d(15,4) @.176° | d(15,4) @.352° | d(15,4) @.528° | |
| d(16,1) @0° | d(16,1) @.176° | d(16,1) @.352° | d(16,1) @.528° | | | | |
| --- | d(16,2) @0° | d(16,2) @.176° | d(16,2) @.352° | d(16,2) @.528° | | | |
| --- | --- | d(16,3) @0° | d(16,3) @.176° | d(16,3) @.352° | d(16,3) @.528° | | |
| --- | --- | --- | d(16,4) @0° | d(16,4) @.176° | d(16,4) @.352° | d(16,4) @.528° | |

FIG. 5D3

OPTICAL SYSTEM FOR COLLECTING DISTANCE INFORMATION WITHIN A FIELD

CROSS-REFERENCE TO RELATED PATENT APPLICATION

This application is a continuation of U.S. patent application Ser. No. 15/685,384, filed Aug. 24, 2017, which claims the benefit of U.S. Provisional Patent Application No. 62/379,130, filed on Aug. 24, 2016, the disclosures of each of which are hereby incorporated by reference in their entirety.

TECHNICAL FIELD

This invention relates generally to the field of optical sensors and more specifically to a new and useful system optical system for collecting distance information in the field of optical sensors.

BACKGROUND

Light detection and ranging (LiDAR) systems have been used in a wide range of applications, e.g., agriculture, forest planning and management, environmental assessment, survey, mapping, imaging, and vehicle automation etc. Unlike cameras, LiDAR systems can be operated at night and under any weather. Further, LiDAR systems are not affected by low sun angles, and can provide distance contours directly based upon returned lights from illuminated objects.

However, it remains a challenge to provide 2D or 3D distance information with higher precision, lower costs and faster results.

SUMMARY

Systems and methods in accordance with various examples of the present disclosure provide a solution to the above-mentioned problems. An example optical system for collecting distance information comprises a bulk receiving optic configured to collect illumination beams of a plurality of illumination sources reflected from a field outside the optical system; a pixel array comprising at least a first column of pixels and a second column of pixels, each pixel in the first column of pixels being offset from an adjacent pixel in the first column of pixels by a first pixel pitch, the second column of pixels being horizontally offset from the first column of pixels by the first pixel pitch, the second column of pixels being vertically offset from the first column of pixels by a first vertical pitch; and a set of input channels interposed between the bulk receiving optic and the pixel array, the set of input channels comprising at least a first plurality of input channels and a second plurality of input channels, each of the first plurality of input channels configured to communicate one of the collected illumination beams from the bulk receiving optic to a corresponding pixel in the first column of pixels, each of the second plurality of input channels configured to communicate one of the collected illumination beams from the bulk receiving optic to a corresponding pixel in the second column of pixels.

In one aspect of the present disclosure, the bulk receiving optic has a first focal length and defines a focal plane opposite the field. The set of input channels comprise an aperture layer disposed substantially coincident the focal plane, the aperture layer comprising a set of apertures that comprises at least a first plurality of apertures and a second plurality of apertures; a set of lens, the set of lens comprising at least a first plurality of lens and a second plurality of lens, each of the first plurality of lens corresponding to one of the first plurality of apertures, each of the second plurality of lens corresponding to one of the second plurality of apertures; and an optical filter disposed adjacent to the set of lens and opposite the set of apertures.

In another aspect of the present disclosure, each input channel in the set of input channels is coaxial with a corresponding pixel in the pixel array such that the set of input channels is positioned in a skewed grid array substantially similar to the pixel array.

In yet another aspect of the present disclosure, each input channel in the set of input channels comprises a lens in the set of lens and a corresponding aperture in the set of apertures, the lens being substantially aligned with the corresponding aperture.

In yet another aspect of the present disclosure, each of the set of lens has a second focal length, and is configured to offset the focal plane opposite the bulk receiving optic by the second focal length and collimate light rays having wavelengths substantially equivalent to an operating wavelength of the optical system.

In yet another aspect of the present disclosure, the optical system further comprises a bulk transmitting optic. The plurality of illumination sources is positioned along a focal plane of the bulk transmitting optic, each illumination beam projected by the bulk transmitting optic having substantially the same size and geometry as a field of view of a corresponding input channel in the set of input channels.

In yet another aspect of the present disclosure, the aperture layer is separately fabricated by selectively metallizing a glass wafer and etching the set of apertures into metallized glass wafer.

In yet another aspect of the present disclosure, the pixel array is integrated on a semiconductor wafer. The bulk receiving optic and the set of input channels are fabricated on the semiconductor wafer using at least one of photolithography technique or wafer-level bond technique.

In yet another aspect of the present disclosure, the fix pixel pitch is n times of the first vertical pitch, in which n is a positive integer.

In yet another aspect of the present disclosure, the optical system further comprises an actuator configured to rotate the pixel array, the set of input channels and the bulk receiving optic around a vertical axis. The actuator comprises a rotary electric motor and an optical encoder, the rotary electric motor configured to control a rotational speed of the pixel array, the set of input channels and the bulk receiving optic based upon outputs of the optical encoder, the optical encoder coupled to the pixel array via a closed-loop feedback circuit.

An example method of making an optical system for collecting distance information comprises providing a bulk receiving optic configured to collect illumination beams of a plurality of illumination sources reflected from a field outside the optical system; providing a pixel array that comprises at least a first column of pixels and a second column of pixels, each pixel in the first column of pixels being offset from an adjacent pixel in the first column of pixels by a first pixel pitch, the second column of pixels being horizontally offset from the first column of pixels by the first pixel pitch, the second column of pixels being vertically offset from the first column of pixels by a first vertical pitch; and positioning a set of input channels interposed between the bulk receiving optic and the pixel array, the set of input channels comprising at least a first plurality of input channels and a second plurality of input channels, each of the first plurality of input channels configured to communicate one of collected illumination beams from the bulk receiving optic to a corresponding pixel in the first column of pixels, each of the second plurality of input channels configured to communicate one of the collected illumination beams from the bulk receiving optic to a corresponding pixel in the second column of pixels.

An example method of collecting distance information comprises using an optical system that has a bulk receiving optic configured to collect reflected illumination beams of a plurality of illumination sources from a field outside the optical system; a pixel array comprising at least a first column of pixels and a second column of pixels, each pixel in the first column of pixels being offset from an adjacent pixel in the first column of pixels by a first pixel pitch, the second column of pixels being horizontally offset from the first column of pixels by the first pixel pitch, the second column of pixels being vertically offset from the first column of pixels by a first vertical pitch; and a set of input channels interposed between the bulk receiving optic and the pixel array, the set of input channels comprising at least a first plurality of input channels and a second plurality of input channels, each of the first plurality of input channels configured to communicate one of collected illumination beams from the bulk receiving optic to a corresponding pixel in the first column of pixels, each of the second plurality of input channels configured to communicate one of the collected illumination beams from the bulk receiving optic to a corresponding pixel in the second column of pixels.

An example method of collecting distance information comprises providing an optical system that has a bulk receiving optic configured to collect reflected illumination beams of a plurality of illumination sources from a field outside the optical system; a pixel array comprising at least a first column of pixels and a second column of pixels, each pixel in the first column of pixels being offset from an adjacent pixel in the first column of pixels by a first pixel pitch, the second column of pixels being horizontally offset from the first column of pixels by the first pixel pitch, the second column of pixels being vertically offset from the first column of pixels by a first vertical pitch; and a set of input channels interposed between the bulk receiving optic and the pixel array, the set of input channels comprising at least a first plurality of input channels and a second plurality of input channels, each of the first plurality of input channels configured to communicate one of collected illumination beams from the bulk receiving optic to a corresponding pixel in the first column of pixels, each of the second plurality of input channels configured to communicate one of the collected illumination beams from the bulk receiving optic to a corresponding pixel in the second column of pixels.

BRIEF DESCRIPTION OF THE FIGURES

FIGS. 5A1-5A2, 5B1-5B3, 5C1-5C3, and 5D1-5D3 are graphical representations of one variation of the system.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
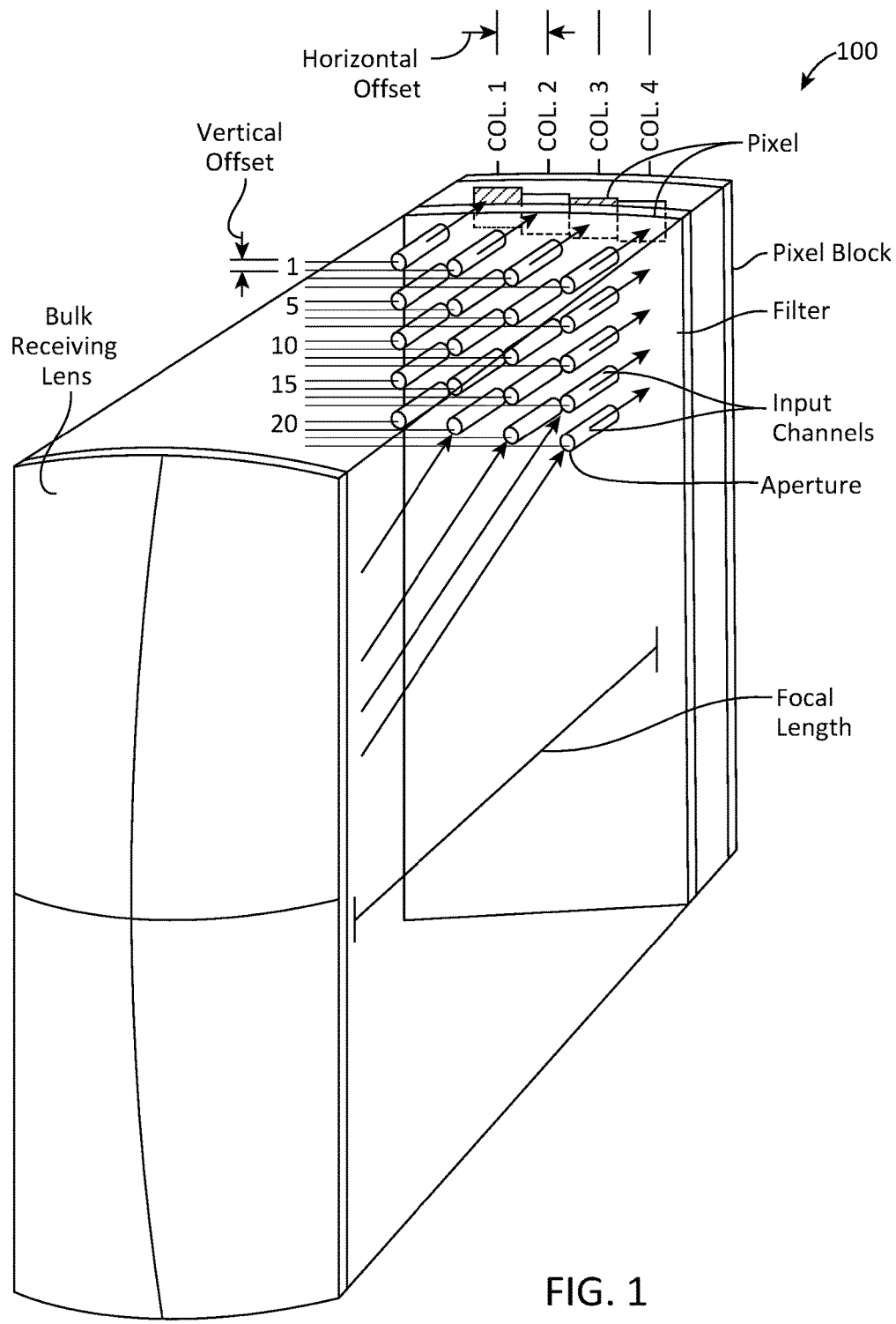
FIG. 1 is a schematic representation of a system.
Figure 2:
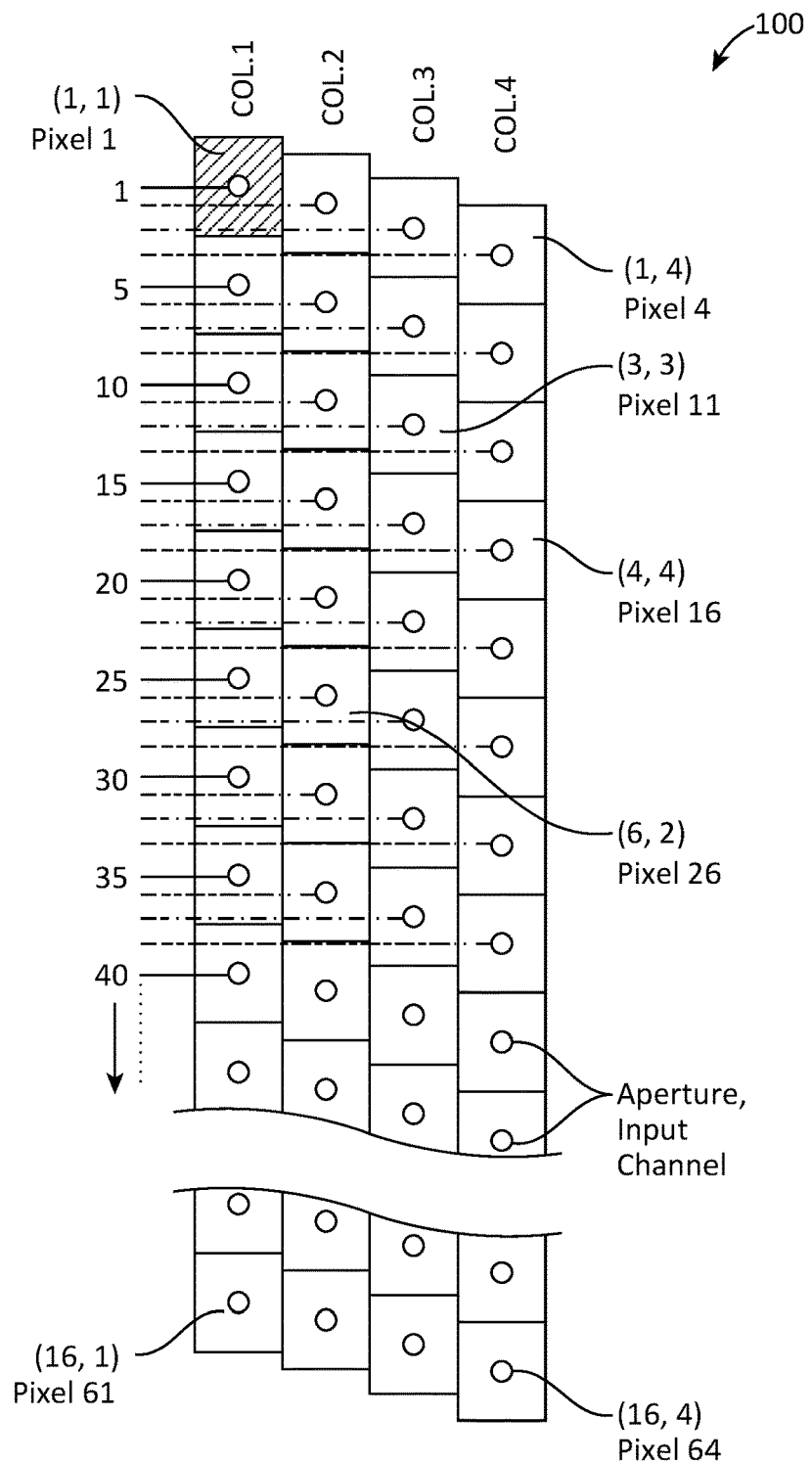
FIG. 2 is a schematic representation of one variation of the system.

As shown in FIGS. 1 and 2, a system for collecting distance information within a field includes: a bulk receiving optic; a pixel block; a first set of input channels; and a second set of input channels. The pixel block includes: a first column of pixels, each pixel in the first column vertically offset from an adjacent pixel in the first column by a pixel pitch; and a second column of pixels horizontally offset from the first column by the pixel pitch and vertically offset from the first column by a vertical pitch, each pixel in the second column vertically offset from an adjacent pixel in the second column by the pixel pitch, the vertical pitch comprising a fraction of the pixel pitch. The first set of input channels interposed between the bulk receiving optic and the pixel block, each input channel in the first set of input channels configured to communicate light incident from the bulk receiving optic to a corresponding pixel in the first column of pixels. The second set of input channels horizontally offset from the set of input channels and interposed between the bulk receiving optic and the pixel block, each input channel in the second set of input channels configured to communicate light incident from the bulk receiving optic to a corresponding pixel in the second column of pixels.

2. Applications

The system functions as an image sensor that, when rotated about an axis parallel to a column of pixels, collects three-dimensional distance data of a volume occupied by the system. In particular, during operation, the system can collect three-dimensional distance data over each of a sequence of scan cycles and can reconstruct these into a virtual three-dimensional representation of the volume occupied by the system, such as based on recorded times between transmission of an illuminating beam from an illumination source and detection of photons at the same or similar frequency or temporal patter at each pixel or by implementing phase-based measurement techniques.

The system includes two or more columns of pixels in a skewed grid array layout, wherein adjacent columns of pixels are vertically and horizontally offset such that the set of pixels project onto a single vertical column of pixels with one pixel per row. The system also includes one input channel per pixel, and the input channels pass light from a common bulk receiving optic to their corresponding pixels. The system can also include an actuator that rotates the pixel block, the input channels, and the bulk receiving optic about a vertical axis such that each pixel (and each corresponding input channel) traverses a unique circular path parallel to and vertically offset from a unique circular path traversed by each other pixel in the system during a single rotation of the rotary actuator (hereinafter a "scan cycle"). The system can collect data from each pixel at each of multiple arcuate sampling positions within one scan cycle and combine these data collected from multiple columns of pixels into a single vertical column of distances—to external surfaces within (approximately) a single vertical plane coincident the axis of rotation of the system—for each arcuate sampling period within the scan cycle. Therefore, the system can output data (e.g., distance values) in a format substantially similar to data output by a similar scanning system including only a single column of pixels. However, because the system includes multiple vertically- and horizontally-offset columns of pixels, each pixel in the system can define a greater height—and therefore include a greater number of detectors and exhibit a greater dynamic range—than a pixel in the similar scanning system of approximately the same overall height and including the same number of pixels at the same effective (vertical) pixel pitch.

The system can output a matrix of range values per scan cycle, wherein all range values in one row of the matrix correspond to outputs of one specific pixel in the pixel block, and wherein each range value in one row of the matrix corresponds to an output of the corresponding pixel at a unique angular position of the sensor block within one scan cycle. Because adjacent pixels columns in the system are horizontally and vertically offset from one another, the system populates each row of a matrix for a scan cycle with one range value at a time (i.e., per target angular sampling position) rather than simultaneously. Horizontal and vertical offset between adjacent columns of pixels also enables each pixel in the system to span a greater area (and thus include more detectors) for a given effective vertical pitch of the system, thereby yielding a relatively large ratio of dynamic range to size of the optical system. Furthermore, though the area of each pixel on the pixel block spans a relatively large area, each pixel is paired with an input channel including an aperture that constrains the field of view of the pixel such that the pixel retains relatively high spatial selectivity. Therefore, the system can include horizontally and vertically offset columns of pixels and corresponding input channels that enable: high dynamic range through large pixel areas; high spatial selectivity through small fields of view for each pixel; and high resolution through small effective pixel vertical pitch within a compact system.

3. Pixel

Figure 4:
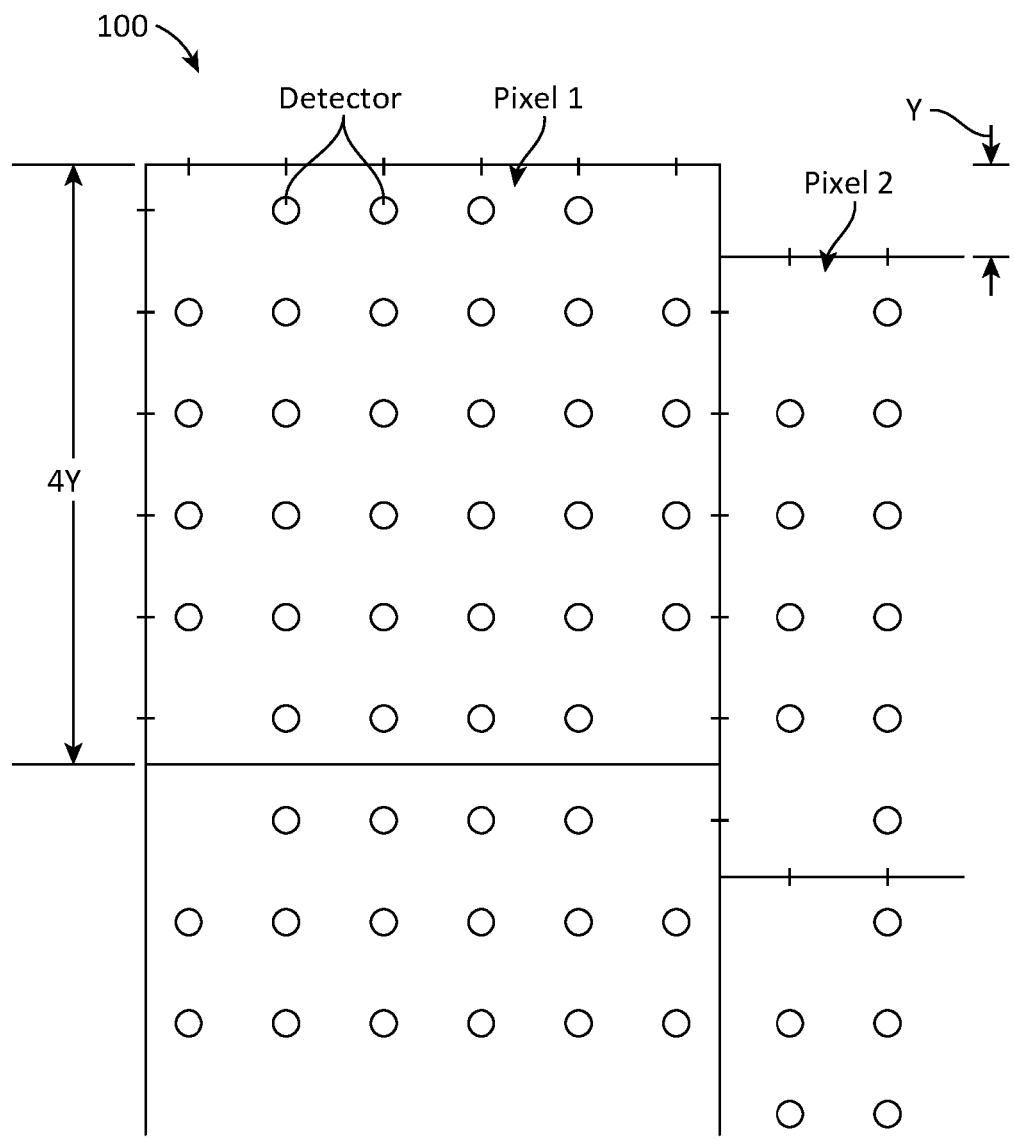
FIG. 4 is a schematic representation of one variation of the system.

The system includes multiple pixels, and each pixel can include one or more detectors configured to detect incident light. For example, a pixel can output a count of incident photons, a time between incident photons, a time of incident photons (e.g., relative to an illumination output time), or other relevant data, and the system can transform these data into distances from the system to external surfaces in the fields of view of these pixels. By merging these distances with the position of pixels at which these data originated and relative positions of these pixels at a time that these data were collected, the system (or other device accessing these data) can reconstruct a three-dimensional (virtual or mathematical) model of a space occupied by the system, such as in the form of 3D image represented by a rectangular matrix of range values, wherein each range value in the matrix corresponds to a polar coordinate in 3D space. Each detector within a pixel can be configured to detect a single photon per sampling period. A pixel can thus include multiple detectors in order to increase the dynamic range of the pixel; in particular, the dynamic range of the pixel (and therefore of the system) can increase as a number of detectors integrated into each pixel increases, and the number of detectors that can be integrated into a pixel can scale linearly with the area of the pixel. For example, a pixel can include an array of single-photon avalanche diode detectors ("SPADs"), such as 32 detectors on a 6×6 grid array less one detector in each of four corners, as shown in FIG. 4. For detectors ten microns in diameter, the pixel can define a footprint approximately 400 microns square. However, the system can include any other type of pixel including any other number of detectors.

4. Pixel Pattern

The system includes a pixel block including: a first column of pixels, each pixel in the first column vertically offset from an adjacent pixel in the first column by a pixel pitch; and a second column of pixels horizontally offset from the first column by the pixel pitch and vertically offset from the first column by a vertical pitch, each pixel in the second column vertically offset from an adjacent pixel in the second column by the pixel pitch, the vertical pitch comprising a fraction of the pixel pitch. Generally, the pixel block includes multiple rows and columns of pixels in a skewed grid array, wherein each column includes multiple pixels vertically aligned, and wherein each row corresponds to a unique vertical distance from the nominal axis of the bulk receiving optic and includes a single pixel, as shown in FIGS. 1, 2, and 4. In particular, the pixel block can include multiple columns of pixels laterally and vertically offset—compared to a single column of pixels—to enable each pixel to be taller and wider—thereby enabling each pixel to include a greater number of detectors and increasing the dynamic range of the system—without necessitating a taller pixel block to accommodate such greater vertical pitch between pixels.

In one implementation, the pixel block and pixels are integrated into a singular integrated circuit. For example, the pixel block and pixels can be defined in a single application-specific integrated circuit (or "ASIC"). In this example, each input channel can include an aperture that limits the field of view of a corresponding pixel on the ASIC in order to achieve greater spatial selectivity for the pixel.

4.1 Pixel Pattern: 32×2:

In one configuration, the system includes two columns of pixels, such as a 32×2 array of pixels and a corresponding 32×2 array of input channels that share a common bulk receiving optic. In this configuration, the system may exhibit a bulk resolution identical to that of a single-column system including the same number of pixels arranged on a pixel block of approximately the same height at the same effective vertical pixel pitch, but the two-column system may exhibit greater dynamic range than the single-column system. In particular, pixels in both a first column and a second column of the two-column system can be offset vertically by a second vertical pitch double a first vertical pitch of the single-column system (e.g., 200 microns versus 100 microns), and the second column of pixels can be offset vertically from the first column of pixels by half of the second virtual pitch, thereby providing space in the two-column system for pixels twice the height of pixels in the single-column system given the same number of pixels arranged on a pixel block of approximately the same height. Therefore, for square pixels, each pixel in the two-column system can define an area approximately four times that of a pixel in the single-column system, can thus include approximately four times the number of detectors as a pixel in the single-column system, and can thus exhibit approximately four times the dynamic range of a pixel in the single-column system. For example, for a pixel block approximately 640 microns tall and including 64 pixels (i.e., a 100-micron vertical pitch): the single-column system can include 64 100-micron-square pixels, each pixel including four 50-micron-wide detectors; and the two-column system can include a first column of 32 200-micron-square pixels and a second column of 32 200-micron-square pixels, each pixel including eight 50-micron-wide detectors.

However, because the two-column system includes two columns of pixels, wherein both columns are horizontally offset from a horizontal center of the system (i.e., a y-axis of the pixel block), pixels in the first column can exhibit fields of view angularly offset—in the horizontal plane—from fields of view of pixels in the second column. Thus, the fields of view of pixels in the first column can be offset laterally from fields of view of pixels in the second column by greater amounts at increasing distances from the system. Horizontal offset between the two columns of pixels that share the same bulk receiving optic can thus manifest as angular offset—in a horizontal plane—between the fields of view of the first column of pixels and the fields of view of the second column of pixels (hereinafter "horizontal distortion").

Furthermore, such horizontal distortion may not be uniform across pixels in one pixel column. In particular, the field of view of a pixel in the first pixel column can be angularly offset from a center (e.g., normal) axis of the bulk lens as a function of distance of the pixel from the center axis of the bulk optic such that a pixel at the bottom of the first pixel column exhibits a maximum negative angular offset in the horizontal plane and such that a pixel at the top of the first pixel column exhibits a similar maximum positive angular offset in the horizontal plane. However, the system can compensate for such variations in horizontal offset angles (e.g., "yaw" angles) of fields of view of pixels in each column in a correction matrix, as described below.

4.2 Pixel Pattern: 16×4:

In another configuration shown in FIGS. 1 and 2, the system includes four columns of pixels, such as a 16×4 array of pixels and a corresponding 16×4 array of input channels that share a common bulk receiving optic. In this configuration, the system may exhibit a bulk resolution identical to that of one- and two-column systems including the same number of pixels arranged on a pixel block of approximately the same height at the same effective vertical pixel pitch, but the four-column system may exhibit greater dynamic range than the one- and two-column systems. In particular, pixels in each column of the four-column system can be offset vertically by a fourth vertical pitch half the second vertical pitch of the two-column system (e.g., 400 microns versus 200 microns), and each column of pixels in the four-column system can be offset vertically from an adjacent column of pixels by one-quarter of the fourth virtual pitch, thereby providing space in the four-column system for pixels twice the height of pixels in the two-column system given the same number of pixels arranged on a pixel block of approximately the same height. Therefore, for square pixels, each pixel in the four-column system can define an area approximately four times that of a pixel in the two-column system, can thus include approximately four times the number of detectors as a pixel in the two-column system, and can thus exhibit approximately four times the dynamic range of a pixel in the two-column system. In the example above, for a pixel block approximately 640 microns tall and including 64 pixels, the four-column system can include four columns of pixels, each column including sixteen 400-micron-square pixels, each pixel including 32 50-micron-wide detectors.

However, because the four-column system includes four columns of pixels, all horizontally offset from a center of the system, pixels in a leftmost column can exhibit fields of view angularly offset—in the horizontal plane—from fields of view of pixels in a rightmost column greater than (e.g., twice) the angular offset—in the horizontal plane—between fields of view of pixels in the first and second columns of the two-column system described above. The four-column system can thus exhibit greater horizontal distortion than the two-column system, such as shown in FIG. 3A.

4.3 Pixel Pattern: 8×8:

In yet another configuration, the system includes eight columns of pixels, such as an 8×8 array of pixels and a corresponding 8×8 array of input channels that share a common bulk receiving optic. In this configuration, the system may exhibit a bulk resolution identical to that of one-, two-, and four-column systems including the same number of pixels arranged on a pixel block of approximately the same height at the same effective vertical pixel pitch, but the eight-column system may exhibit greater dynamic range than the one-, two-, and four-column systems. In particular, pixels in each column of the eight-column system can be offset vertically by an eight vertical pitch twice the fourth vertical pitch of the four-column system (e.g., 800 microns versus 400 microns), and each column of pixels in the eight-column system can be offset vertically from an adjacent column of pixels by one-eighth of the eight virtual pitch, thereby providing space in the eight-column system for pixels twice the height of pixels in the four-column system given the same number of pixels arranged on a pixel block of approximately the same height. Therefore, for square pixels, each pixel in the eight-column system can define an area approximately four times that of a pixel in the four-column system, can thus include approximately four times the number of detectors as a pixel in the four-column system, and can thus exhibit approximately four times the dynamic range of a pixel in the four-column system. In the example above, for a pixel block approximately 640 microns tall and including 64 pixels, the eight-column system can include eight columns of pixels, each column includes eight 800-micron-square pixels, each pixel including ~120 50-micron-wide detectors.

However, because the eight-column system includes eight columns of pixels, all horizontally offset from a center of the system, pixels in a leftmost column can exhibit fields of view angularly offset—in the horizontal plane—from fields of view of pixels in a rightmost column twice the angular offset—in the horizontal plane—between fields of view of pixels in the leftmost and rightmost columns of the four-column system. The eight-column system can thus exhibit greater horizontal distortion than the four-column system described above.

However, the system can include any other number of pixels arranged in any other number of columns or rows to achieve at least a threshold resolution, a minimum dynamic range, a maximum horizontal and/or vertical optical distortion of the fields of views of pixels on the periphery of the pixel block, or a maximum width and/or height of the pixel block, etc.

5. Bulk Receiving Optic and Input Channels

Figure 3B:
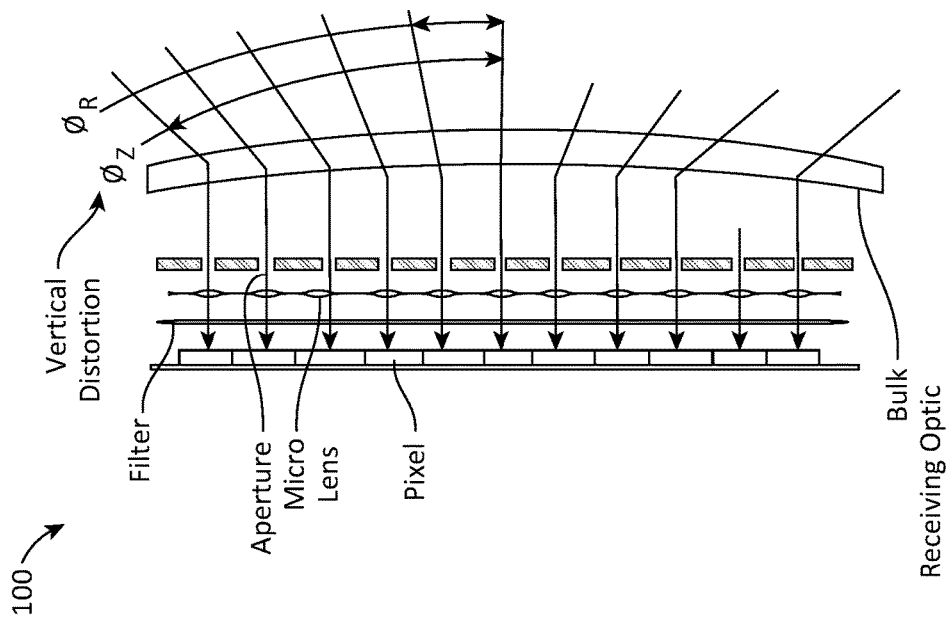
FIGS. 3A and 3B are graphical representations of one variation of the system.
Figure 3A:
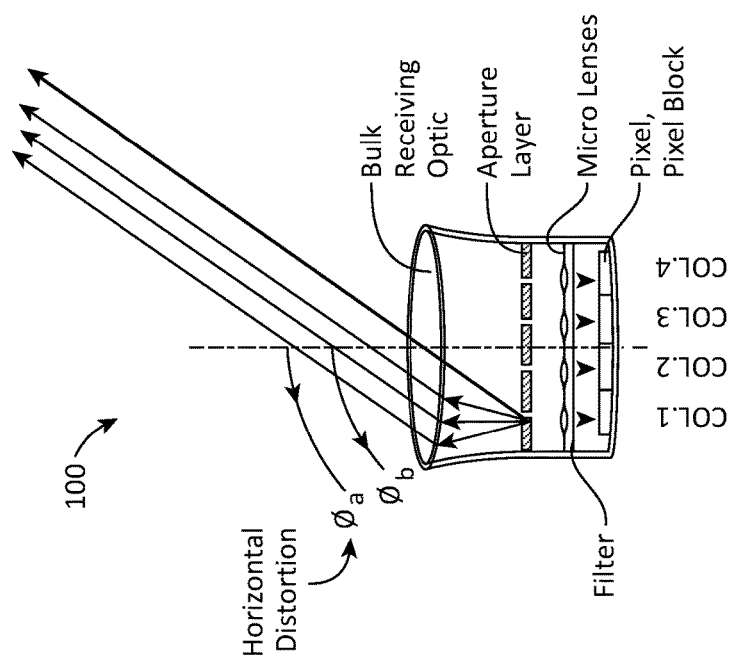

As shown in FIGS. 1, 3A, and 3B, the system also includes: a bulk receiving optic; a first set of input channels interposed between the bulk receiving optic and the pixel block, each input channel in the first set of input channels configured to communicate light incident from the bulk receiving optic to a corresponding pixel in the first column of pixels; and a second set of input channels horizontally offset from the set of input channels and interposed between the bulk receiving optic and the pixel block, each input channel in the second set of input channels configured to communicate light incident from the bulk receiving optic to a corresponding pixel in the second column of pixels. Generally, the bulk receiving optic functions to collect light (i.e., electromagnetic radiation) from outside the system; and each input channel functions to collect light from the bulk receiving optic, to filter this light, and to pass light over a relatively narrow wavelength band to a corresponding pixel in the pixel block.

In one implementation, each input channel is coaxial with its corresponding pixel such that the first and second sets of input channels are arranged in a skewed grid array substantially similar to the skewed grid array defined by the pixels, as described above. Each input channel can include: an aperture arranged on the focal plane; a filter configured to pass perpendicular incident light at an operating frequency (or within a narrow operating band); an input lens interposed between the aperture and the filter and configured to output collimated light to the filter; and an output lens adjacent the filter opposite the input lens and configured to spread light passed by the filter across a corresponding pixel in the pixel block (and/or to re-focus light passed by the filter into the active areas of a corresponding pixel). Generally, the bulk receiving optic, apertures, input lenses, optical filter, and the pixels cooperate to collect light (e.g., ambient light and light output by the illumination source), to collimate this light, to reject all light outside of a narrow band of wavelengths including a center output wavelength of an illumination source (described below), and to detect light that reached the pixel. The system can thus transform an incident photon count, a time between incident photons, an incident photon time relative to an illumination beam output time, etc. recorded by a particular pixel during one sampling period into a distance from the system to an external surface in a field of view of the particular pixel, as defined by a corresponding input channel and the bulk receiving optic.

In this implementation, the set of input channels can be defined in a single input block including: an aperture layer arranged behind the bulk receiving optic and defining one input aperture per input channel; a lens layer adjacent the aperture layer opposite the bulk receiving optic and defining an input lens substantially axially aligned with a corresponding input aperture for each input channel; and an optical filter adjacent the lens layer opposite the aperture layer and spanning the lens layer. In this implementation, the bulk receiving optic is characterized by a bulk focal distance, is offset from a focal plane by the bulk focal distance, and functions to project incident light rays from outside the system toward the focal plane. For example, the bulk receiving optic can include multiple lenses, such as one or more bi-convex lenses (shown in FIGS. 1 and 4) and/or plano-convex lenses, that cooperate to form a converging lens characterized by a particular bulk focal length at or near the center wavelength of perpendicular light rays passed by the optical filter (i.e., a "nominal operating wavelength of the system"). (The bulk receiving lens can also define a nominal axis perpendicular to the focal plane, as referenced below.)

The aperture layer: includes a relatively thin opaque structure arranged behind the bulk receiving optic and coincident the focal plane; and defines one aperture per input channel and a stop region around the apertures. The stop region of the aperture layer rejects (e.g., blocks, absorbs, reflects) incident light rays, and each aperture passes incident light rays toward its corresponding input lens. For example, the aperture layer can define a set of apertures, wherein each aperture is of a diameter approaching a diffraction-limited diameter to maximize geometrical selectivity of the field of view of the system.

In this implementation, the input lens is characterized by a second focal length, is offset from the focal plane by the second focal length, collimates lights rays passed by the aperture, and passes collimated light rays to the optical filter. For example, the input block can include one input lens per channel, wherein each input lens includes a converging lens characterized by a ray cone substantially matched to a ray cone of the bulk receiving optic and can be offset from the focal plane of the bulk receiving optic by a relatively short second focal length to preserve the aperture of the bulk receiving optic and to collimate light passed by a corresponding aperture. The optical filter receives collimated light—in a spectrum of wavelengths—from the input lens, passes a relatively narrow band of wavelengths of light (e.g., the operating wavelength+/−0.25 nanometers) to the corresponding pixel, and blocks (e.g., reflects, absorbs) light outside of this narrow wavelength band. For example, the optical filter can include a narrow optical bandpass filter.

In one example in which the system includes an illumination source, as described below, the illumination source can output light (predominantly) at a nominal wavelength of 900 nm, and the optical filter can define a planar optical bandpass filter configured to pass light (incident on the optical filter at an angle of 90°) between 899.95 nm and 900.05 nm and configured to block substantially all light (incident on the optical filter at an angle of 90°) outside of this band. A pixel in the set of pixels can thus receive light (i.e., "photons") passed by the optical filter, detect these incident photons, and output a signal corresponding to a number or rate of detected photons during a sampling period.

In this implementation, the bulk receiving optic, the aperture layer, the lens layer, the optical filter, and the output lenses can be fabricated and then aligned with and mounted onto the pixel block. In one example, the optical filter is fabricated by coating a fused silica substrate. Photoactive optical polymer is then deposited over the optical filter, a lens mold defining an array of lens forms placed over the photoactive optical polymer, and a UV light source activated to cure the photoactive optical polymer into a pattern of lenses across the optical filter. Standoffs are similarly molded or formed across the optical filter via photolithography techniques. The aperture layer is separately fabricated by selectively metallizing a glass wafer and etching apertures into this metallic layer; the glass wafer is then bonded or otherwise mounted to these standoffs. In this example, the assembly is subsequently inverted, and a second set of standoffs is similarly fabricated across the optical filter opposite the lens layer. The pixel block (e.g., a discrete image sensor) is aligned with and bonded to the second set of standoffs; the bulk receiving optic is similarly mounted over the aperture layer to complete the system.

Alternatively, the pixel block can be fabricated on a semiconductor wafer (e.g., in the form of an application-specific integrated circuit), and the bulk receiving optic, the aperture layer, the lens layer, and the optical filter can be fabricated directly onto the semiconductor wafer—over the pixel block—via photolithography and wafer-level bonding techniques. However, the bulk receiving optic, the aperture layer, the lens layer, the optical filter, and the pixel block can be fabricated and assembled in any other way and according to any other method or technique.

6. Output Circuit

The system can include an output circuit, including a bulk transmitting optic and an illumination source. In one implementation, the bulk transmitting optic: is substantially identical to the bulk receiving optic in material, geometry (e.g., focal length), optical properties, and/or thermal isolation, etc.; and is adjacent and offset laterally and/or vertically from the bulk receiving optic.

In one example, the illumination source includes a monolithic VCSEL array of optical emitters arranged behind the bulk transmitting optic. In this example, the illumination source can include a laser diode array defining a column of optical emitters characterized by an emitter pitch distance substantially identical to the aperture pitch distance. In this example, each optical emitter can output an illuminating beam of an initial diameter substantially identical to (or slightly greater than) the diameter of a corresponding aperture in the aperture layer, and the illumination source can be arranged along the focal plane of the bulk transmitting optic such that each illuminating beam projected from the bulk transmitting optic into the field ahead of the system is of substantially the same size and geometry as the field of view of a corresponding input channel—and therefore the field of view of a corresponding pixel—at any distance from the system. Therefore, the illumination source and the bulk transmitting optic can cooperate to project substantially illuminating beams into the fields of view of the input channels with relatively little or no light projected beyond these fields of view of the input channels.

In this example, the system can selectively project illuminating beams into a field ahead of the system according to an illumination pattern that substantially matches—in size and geometry across a range of distances from the system—the fields of view of the input channels (e.g., fields of view defined by the apertures). Therefore, the illumination source can illuminate substantially only surfaces in the field ahead of the system that are within the fields of view of corresponding pixels such that minimal power output by the system via the illumination source is wasted by illuminating surfaces in the field for which the pixels are blind. Furthermore, the center output wavelength of the illumination source can be matched to the center wavelength passed by the filter. The system can thus achieve a relatively high ratio of signal (e.g., photons originating from the illumination source and passed to the pixels on the sensor block) to noise (e.g., photons not originating from the illumination source, such as ambient light, and passed to the pixels on the sensor block).

7. Data Acquisition

During operation, the system can collect light data from the set of pixels and transform these light data into distance values during a single sampling period. In one implementation, during a sampling period, the system: activates the illumination source of the output circuit in order to project light into fields of view of each pixel and input channel; records a time that the illumination source was activated (an "illumination timestamp"); and reads each detector in each pixel, such as by storing in memory a number of detectors in each pixel that recorded an incident photon since a last sampling period and incident times of these photons and then clearing all detectors in each pixel. During a sampling period, the system can also calculate a distance to a surface in a field of view of a pixel based on a difference between the illumination timestamp and a time of peak frequency of incident photons since the last sampling period for each pixel in the set. For example, for each pixel, upon conclusion of a sampling period, the system can implement time of flight techniques to transform an illumination timestamp and a time of peak incident photon rate at a pixel between the current and a last sampling period into a distance from the system to an external surface within the field of view of the pixel. However, the system can implement any other method of technique to illuminate fields of view of each pixel and input channel during a sampling period and to process data collected from the set of pixels into distance values or related values.

The system can further include an actuator configured to rotate the pixel block, input block, and bulk receiving optic during operation. For example: the rotary actuator can include a rotary electric motor with an optical encoder; the pixel block, input block, and bulk receiving optic can be mounted in-unit on an output shaft of the rotary electric motor; and the system can implement closed-loop feedback controls to maintain the rotational speed of the rotary electric motor at 60 Hz (or 360 rpm) based on outputs of the optical encoder.

As described below, the system can execute one sampling period at each of a number of arcuate sampling positions per single rotation of the pixel block. For example, the system can execute 2048 arcuate sampling positions and output a single nominal matrix containing 2048 columns of distance values per each 360° rotation of the pixel block (i.e., scan cycle), wherein a single nominal matrix generated during a scan cycle thus represents distances from the system to external surfaces 360° around the sensor (at some viewing angle defined by the bulk receiving optic and a number of pixels in each column of pixels).

8. Nominal Matrix

Because the system includes multiple columns of pixels, data output by the set of pixels during a single sampling period corresponds to multiple columns of distance values, each column corresponding to a unique yaw angle relative to the pixel block. Similarly, because each pixel in the system is arranged at a unique vertical position (i.e., because the array of pixels project to a single column of non-overlapping pixels), data output by the set of pixels during a single sampling period corresponds to multiple rows of distance values, wherein each row includes a single distance value and corresponds to a unique pitch angle relative to the pixel block. In particular, the system can assemble data collected from the set of pixels during a single sampling period into multiple incomplete columns of distance values, wherein each incomplete column of distance values corresponds to one unique yaw angle.

Figure 5A2:
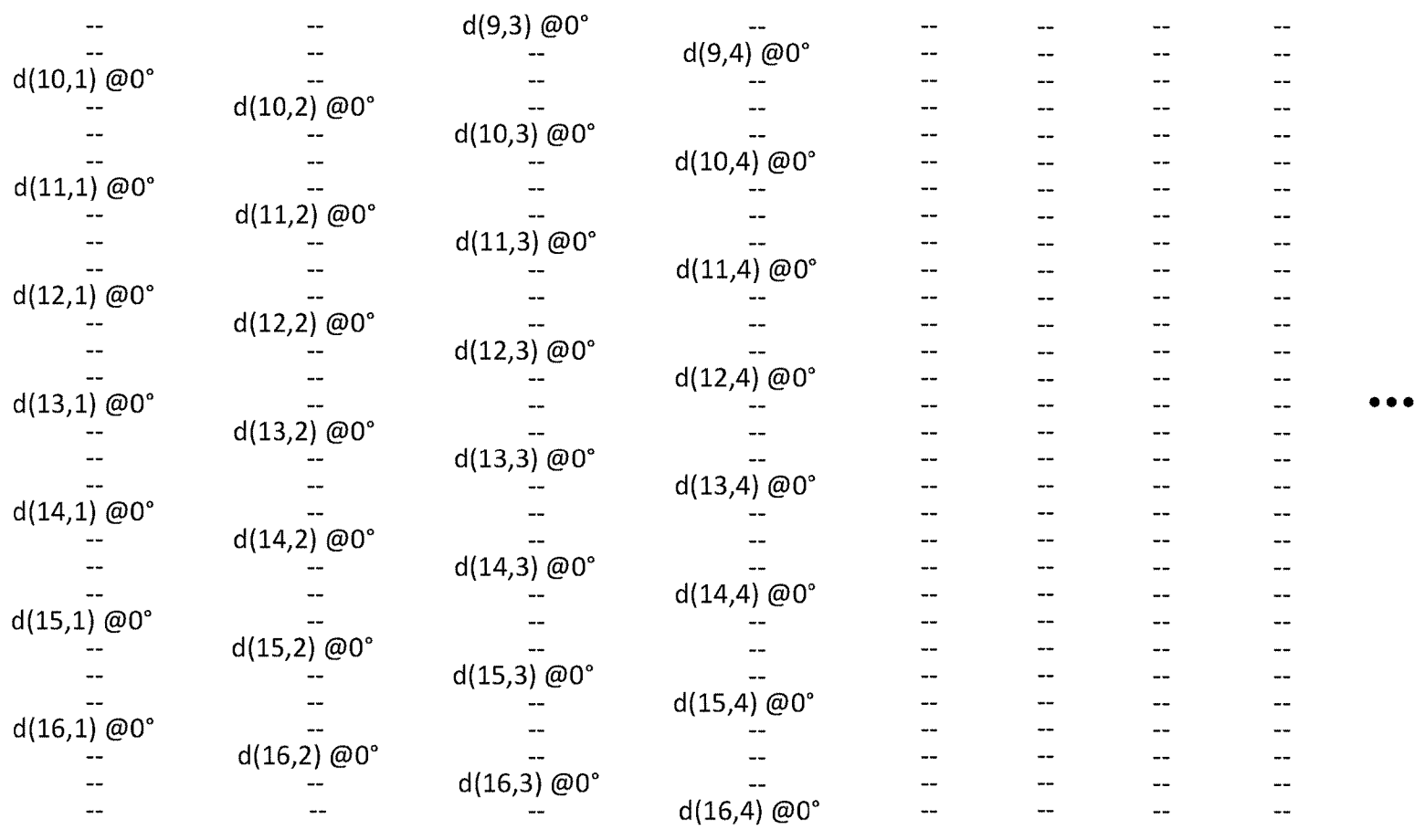

However, the system can combine distance values generated from data collected from a second column of pixels during a first sampling period with distance values generated from data collected by a first column of pixels during a second sampling period in order to complete a second column of distance values, as shown in FIGS. 5A1-5A2. The system can repeat this process at each arcuate sampling position during a single rotation of the system (i.e., a single scan cycle) in order to generate a matrix (or other data container) containing one complete column of distance values for non-overlapping pitch angles for each arcuate sampling position implemented by the system, as shown in FIGS. 5D1-5D3.

In one example, the system includes a 16×4 array of pixels with a vertical offset of Y between adjacent columns of pixels and a pixel pitch of 4Y in each column of pixels, as shown in FIGS. 2 and 4. In this example, the system implements 2048 sampling periods per rotation for an angular offset of 0.176° between adjacent arcuate sampling positions. At a first arcuate sampling position of 0°, the system executes a first sampling routine, as described above. The system then: populates the [(1,1), (5,1), (9,1), . . . (57,1), and (61,1)] positions within a distance matrix with distance values calculated from data received from the first, second, third, fourth, . . . fifteenth, and sixteenth pixels in the first column, respectively, during the first sampling period; populates the [(2,2), (6,2), (10,2), . . . (58,2), and (62,2)] positions within the distance matrix with distance values calculated from data received from the first, second, third, fourth, . . . fifteenth, and sixteenth pixels in the second column, respectively; populates the [(3,3), (7,3), (11,3), . . . (59,3), and (63,3)] positions within the distance matrix with distance values calculated from data received from the first, second, third, fourth, . . . fifteenth, and sixteenth pixels in the third column, respectively; and populates the [(4,4), (8,4), (12, 4), . . . (60,4), and (64,4)] positions within the distance matrix with distance values calculated from data received from the first, second, third, fourth, . . . fifteenth, and sixteenth pixels in the fourth column, respectively, as shown in FIGS. 5A1-5A2.

Figure 5B2:
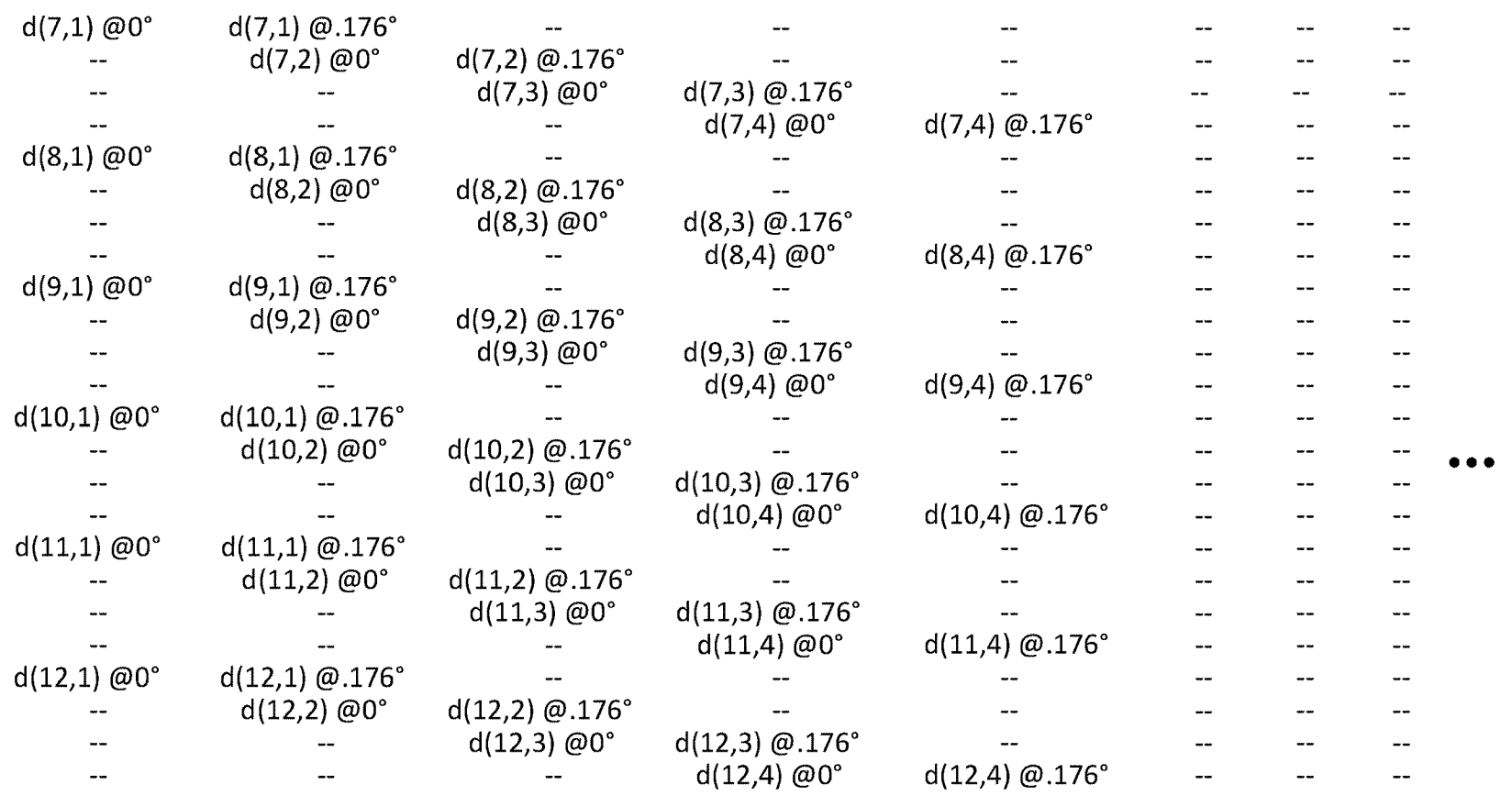
Figure 5B3:
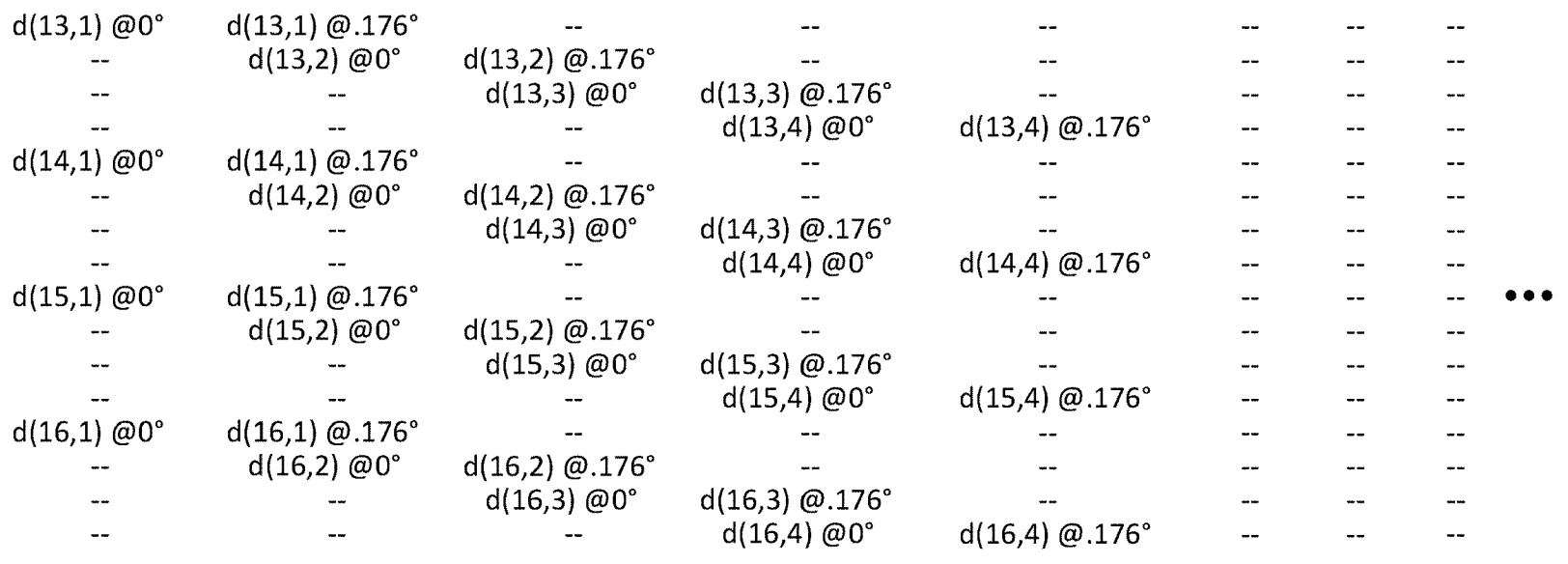

During the same scan cycle, the rotary actuator rotates the pixel block to a next arcuate sampling position of 0.176°, and the system then executes a second sampling routine. During the second sampling, the system: populates the [(1,2), (5,2), (9,2), . . . (57,2), and (61,2)] positions within the distance matrix with distance values calculated from data received from the first, second, third, fourth, . . . fifteenth, and sixteenth pixels in the first column, respectively, during the second sampling period; populates the [(2,3), (6,3), (10,3), . . . (58,3), and (62,3)] positions within the distance matrix with distance values calculated from data received from the first, second, third, fourth, . . . fifteenth, and sixteenth pixels in the second column, respectively; populates the [(3,4), (7,4), (11,4), . . . (59,4), and (63,4)] positions within the distance matrix with distance values calculated from data received from the first, second, third, fourth, . . . fifteenth, and sixteenth pixels in the third column, respectively; and populates the [(4,5), (8,5), (12,5), . . . (60,5), and (64,5)] positions within the distance matrix with distance values calculated from data received from the first, second, third, fourth, . . . fifteenth, and sixteenth pixels in the fourth column, respectively, as shown in FIGS. 5B 1-5B3. The system repeats this process for each subsequent arcuate sampling position of the scan cycle, such as shown in FIGS. 5C1-5C3 and 5D1-5D3, in order to form a 2048×64 matrix containing 2048 columns, wherein each column corresponds to a unique yaw angle relative to the rotary actuator and contains 64 distance values, wherein each distance value in a column corresponds to a unique pitch angle relative to the pixel block, as shown in FIG. 3B.

The system can thus construct one nominal matrix containing a column of distance values corresponding to each arcuate sampling position within a single 360° rotation of the pixel per scan cycle. In particular, the system can generate one nominal matrix—per scan cycle—representing distances of surfaces from the pixel block about a full 360° rotation axis of the system. For example, the rotary actuator can rotate the system at a rate of 360 rpm, and the system can generate one nominal matrix per 16.7 milliseconds (i.e., at a rate of 60 Hz).

Furthermore, to achieve vertical alignment of the pixel columns at each sampling position, two adjacent columns of pixels (and two corresponding columns of input channels) can be horizontally offset by a horizontal pitch distance corresponding to a focal length of the bulk receiving optic and an angular pitch between adjacent arcuate sampling positions. In one example, the pixel block includes a 16×4 array of pixels, the bulk receiving optic is characterized by a focal length of 10 millimeters, each input channel is coaxial with its corresponding pixel, and the system implements 2048 sampling periods per scan cycle (i.e., per rotation). In this example, the angular offset between adjacent arcuate sampling positions is 0.176°, and the horizontal offset between adjacent pixel columns—and adjacent columns of corresponding apertures—is 400 microns such that the second column of pixels at a second arcuate sampling position of 0.176° is vertically aligned with a first column of pixels in a first arcuate sampling position of 0°. During a single scan cycle, the system can thus sample all pixels at each of the 2048 arcuate sampling positions to collect 2048 columns of light data in a single 360° rotation.

9. Distortion Correction

Because the system contains multiple laterally-offset columns of pixels sharing a common bulk receiving optic, the fields of view of pixels in two adjacent columns of pixels may not share the same yaw angle relative to the pixel block, as shown in FIG. 3A. Thus, a column in a nominal matrix constructed from data collected over a sequence of sampling periods during a scan cycle can contain a set of distance values representing multiple different true yaw angles relative to the pixel block. For example, for the system described above that includes a 16×4 skewed grid array of pixels: pixels in the first column can exhibit fields of view offset− 0.03° in yaw from the nominal axis of the bulk receiving optic; pixels in the second column can exhibit fields of view offset−0.01° in yaw from the nominal axis of the bulk receiving optic; pixels in the third column can exhibit fields of view offset+0.01° in yaw from the nominal axis of the bulk receiving optic; and pixels in the fourth column can exhibit fields of view offset+0.03° in yaw from the nominal axis of the bulk receiving optic given a particular operating temperature. In this example: a (1,1) distance value in the nominal matrix can thus represent a distance to a surface in a field of view angularly offset from the nominal axis of the bulk receiving optic by −0.03° in yaw; a (2,1) distance value in the nominal matrix can thus represent a distance to a surface in a field of view angularly offset from the nominal axis of the bulk receiving optic by −0.01° in yaw; . . . a (63,1) distance value in the nominal matrix can thus represent a distance to a surface in a field of view angularly offset from the nominal axis of the bulk receiving optic by +0.01° in yaw; and a (64,1) distance value in the nominal matrix can thus represent a distance to a surface in a field of view angularly offset from the nominal axis of the bulk receiving optic by +0.03° in yaw at the particular operating temperature.

Similarly, because pixels in a single column within the system are vertically offset but share a common bulk receiving optic, the fields of view of two adjacent pixels in one column of pixels may not share the same pitch angle relative to the pixel block, as shown in FIG. 3B. Thus, a column in a nominal matrix constructed from data collected during a scan cycle can contain a set of distance values representing multiple different true yaw pitch angles relative to the pixel block. For example, for the system described above that includes a 16×4 skewed grid array of pixels: a first pixel in the first column can exhibit a field of view offset+0.25° in pitch from the nominal axis of the bulk receiving optic; a second pixel in the first column can exhibit a field of view offset+0.22° in pitch from the nominal axis of the bulk receiving optic; . . . a sixteenth pixel in the first column can exhibit a field of view offset−0.25° in pitch from the nominal axis of the bulk receiving optic; a first pixel in the second column can exhibit a field of view offset+0.243° in pitch from the nominal axis of the bulk receiving optic; a second pixel in the second column can exhibit a field of view offset+0.235° in pitch from the nominal axis of the bulk receiving optic; . . . a sixteenth pixel in the second column can exhibit a field of view offset−0.258° in pitch from the nominal axis of the bulk receiving optic; etc. In this example: a (1,1) distance value in the nominal matrix can thus represent a distance to a surface in a field of view angularly offset from the nominal axis of the bulk receiving optic by +0.25° in pitch; a (2,1) distance value in the nominal matrix can represent a distance to a surface in a field of view angularly offset from the nominal axis of the bulk receiving optic by +0.243° in pitch; a (3,1) distance value in the nominal matrix can represent a distance to a surface in a field of view angularly offset from the nominal axis of the bulk receiving optic by +0.235° in pitch; a (4,1) distance value in the nominal matrix can represent a distance to a surface in a field of view angularly offset from the nominal axis of the bulk receiving optic by +0.228° in pitch; a (5,1) distance value in the nominal matrix can represent a distance to a surface in a field of view angularly offset from the nominal axis of the bulk receiving optic by +0.22° in pitch; etc.

The system can thus generate a nominal matrix containing distance values—corresponding to data collected by the set of pixels during a scan cycle—representing distances to surfaces in fields of view offset from the nominal axis of the bulk receiving optic in both pitch and yaw axes. In particular, the system can generate a nominal matrix containing a column of distance values representing a single "ideal" yaw angle of 0° relative to the sensor block (e.g., similar to fields of view of a single column of pixels), but the real horizontal offset between columns of pixels in the system can yield a difference between this ideal yaw angle and the actual yaw angle of fields of view of pixels represented in this column of distance values in the nominal matrix; this difference can manifest as distortion of distance data along the horizontal axis. Similarly, pixels in a single column of pixels can exhibit fields of view that increase in pitch angle offset from the nominal axis of the bulk receiving optic with increasing distance from the center of the grid array of pixels, which can manifest as a lowest resolution at the first and last rows and as a greatest resolution at the center row(s) in the nominal matrix.

The system can thus pair a nominal matrix with a correction matrix defining pitch and yaw offset angles for each entry in the nominal matrix. In particular, by merging distance values contained in a nominal matrix output in a scan cycle with corresponding angular values contained in a correction matrix, the system (or other device) can calculate positions of surfaces detected during the scan cycle to an improved degree of accuracy. For example, for pixels in the first column of pixels that exhibit fields of view offset−0.03° in yaw from the nominal axis of the bulk receiving optic, the correction matrix can define a five-centimeter leftward correction of a (1,1) distance value of 100 meters in the nominal matrix (e.g., 100 meters×sin(−0.03°)=5.2 centimeters).

Furthermore, pitch and yaw offset angles of a field of a view of each pixel in the system can vary with (i.e., be a function of) the focal length of the bulk receiving optic, and the focal length of the bulk receiving optic can vary with temperature of the system. Therefore, the system can pair the nominal matrix with a correction matrix based on a temperature of the system, such as for a bulk receiving optic including one or more polymer lenses. In one implementation, the system stores a set of preset correction matrices, wherein each correction matrix corresponds to a particular temperature and contains pitch and yaw offset angles for the field of view of each pixel in the system at the particular temperature. In this implementation, the system: can also include a temperature sensor thermally coupled to the bulk receiving optic; can sample the temperature sensor during operation (e.g., once per scan cycle); and can pair a nominal matrix generated from data collected during a scan cycle with a correction matrix —selected from the set of correction matrices—corresponding to a temperature nearest a temperature of the bulk receiving optic recorded during the same scan cycle. For example, for the system that operates within a temperature range from 119° F. to 121° F., the system can contain 21 preset correction matrices, each correction matrix corresponding to one of 21 0.1° F. temperature steps between 119° F. and 121° F., inclusive. For example, each correction matrix can be generated empirically by characterizing the fields of view of pixels within the system at select operating temperatures.

Alternatively, the system can implement a parametric model or other parametric function to generate a correction matrix based on the temperature of the bulk receiving optic (or other element within the system). However, the system can implement any other method or technique to pair a nominal matrix generated from data collected during a scan cycle with a correction matrix representing horizontal and vertical distortion of data contained within the nominal matrix.

10. Increased Resolution

In one variation, the system increases a number of angular sampling executed positions per rotation in order to increase the resolution of a nominal matrix generated during a scan cycle. In one implementation, the system includes a skewed grid array of pixels, wherein adjacent columns of pixels (and corresponding columns of input channels) are offset laterally by a distance corresponding to X-number of radial steps in a single rotation (e.g., 2048 steps at 0.1760 between steps) but executes 2X equidistant arcuate sampling positions per complete rotation (e.g., 4096 arcuate sampling positions at 0.0880 between steps per scan cycle).

In the example described above in which the system includes a 16×4 array of pixels, the system executes a first sampling routine at a first arcuate sampling position of 0° and then: populates the [(1,1), (5,1), (9,1), . . . (57,1), and (61,1)] positions within a first column in a distance matrix with distance values calculated from data received from the first, second, third, fourth, . . . fifteenth, and sixteenth pixels in the first column of pixels, respectively, during the first sampling period; populates the [(2,3), (6,3), (10,3), . . . (58,3), and (62,3)] positions within the third column of the distance matrix with distance values calculated from data received from the first, second, third, fourth, . . . fifteenth, and sixteenth pixels in the second column of pixels, respectively; populates the [(3,5), (7,5), (11,5), . . . (59,5), and (63,5)] positions within the fifth column of the distance matrix with distance values calculated from data received from the first, second, third, fourth, . . . fifteenth, and sixteenth pixels in the third column of pixels, respectively; and populates the [(4,7), (8,7), (12,7), . . . (60,7), and (64,7)] positions within the seventh column of the distance matrix with distance values calculated from data received from the first, second, third, fourth, . . . fifteenth, and sixteenth pixels in the fourth column of pixels, respectively.

In this example, the rotary actuator rotates the pixel block, and the system executes a second sampling routine once the pixel block reaches a next arcuate sampling position of 0.088°. The system then: populates the [(1,2), (5,2), (9,2), . . . (57,2), and (61,2)] positions within a second column in the distance matrix with distance values calculated from data received from the first, second, third, fourth, . . . fifteenth, and sixteenth pixels in the first column of pixels, respectively, during the first sampling period; populates the [(2,4), (6,4), (10,4), . . . (58,4), and (62,4)] positions within the fourth column of the distance matrix with distance values calculated from data received from the first, second, third, fourth, . . . fifteenth, and sixteenth pixels in the second column of pixels, respectively; populates the [(3,6), (7,6), (11,6), . . . (59,6), and (63,6)] positions within the sixth column of the distance matrix with distance values calculated from data received from the first, second, third, fourth, . . . fifteenth, and sixteenth pixels in the third column of pixels, respectively; and populates the [(4,8), (8,8), (12, 8), . . . (60,8), and (64,8)] positions within the eight column of the distance matrix with distance values calculated from data received from the first, second, third, fourth, . . . fifteenth, and sixteenth pixels in the fourth column, respectively.

The system repeats this process once upon reaching a third arcuate sampling position at 0.176°, then at a fourth arcuate sampling position of 0.264°, and for each subsequent arcuate sampling position in a full rotation of the pixel block in order to form a 4096×64 matrix containing 4096 columns, wherein each column corresponds to a unique yaw angle relative to the rotary actuator and contains 64 distance values, wherein each distance value in a column corresponds to a unique pitch angle relative to the pixel block.

However, the system can execute a sampling period at any other number of arcuate sampling positions during a complete rotation of the pixel block (e.g., during a compete scan cycle), and the system can implement any other method or technique to transform data collected from the set of pixels during a scan cycle into a nominal matrix of distances from the system to external surfaces nearby.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

What is claimed is:

1. An optical system for performing distance measurements, the optical system comprising:
   an optical imaging receive module comprising a bulk receiver optic, an aperture layer including a plurality of apertures, a lens layer including a plurality of lenses, and a pixel block including a plurality of pixels, wherein the aperture layer, lens layer and pixel block are arranged to form a plurality of input channels with each input channel in the plurality of input channels including an aperture from the plurality of apertures, a lens from the plurality of lenses and a pixel from the plurality of pixels and being configured to communicate light incident from the bulk receiving optic to the pixel of the input channel;
   an optical imaging transmit module comprising a bulk transmitter optic and an illumination source comprising a plurality of lasers, each laser in the plurality of lasers configured to project a discrete illuminating beam at an operating wavelength through the bulk transmitter optic;
   a rotary actuator comprising a rotary electric motor operatively coupled to rotate the plurality of input channels and the bulk receiver optic about a full 360 degree rotation axis of the system.

2. The optical system of claim 1 wherein the rotary actuator further comprises an optical encoder and wherein the system further comprises circuitry coupled to the rotary actuator to control a rotational speed of the rotary electric motor based on outputs of the optical encoder.

3. The optical system of claim 1 wherein the optical system is configured to execute a plurality of sampling periods during each rotation of the rotary actuator in which the optical imaging transmit module activates the illumination source to project light through the bulk transmitter optic into fields of view of the input channels, where each sampling period in the plurality of sampling periods is taken at a different arcuate sampling position.

4. The optical system of claim 3 wherein the system is configured to, during operation, collect three-dimensional distance data over each of a sequence of scan cycles that can be reconstructed into a virtual three-dimensional representation of a volume occupied by the system.

5. The optical system of claim 1 further comprising an optical filter between the bulk receiver optic and the pixel block, the optical filter configured to pass a narrow band of radiation that includes the operating wavelength of the plurality of lasers to the plurality of pixels while blocking radiation outside the band.

6. The optical system of claim 5 wherein the plurality of pixels in the pixel block are arranged in a two-dimensional array.

7. The optical system of claim 6 wherein the two-dimensional array includes a plurality of columns of pixels with each pixel in a given column being offset from an adjacent pixel in the given column by a first pixel pitch and wherein each column of pixels is horizontally offset from an adjacent column of pixels by the first pixel pitch and vertically offset from the adjacent column by a second pixel pitch.

8. The optical system of claim 7 wherein the rotary actuator is configured to rotate the optical imaging receive module about a vertical axis such that each pixel and corresponding input channel traverses a unique circular path parallel to and vertically offset from a unique circular path traversed by the other pixels and corresponding input channels during a single rotation of the rotary actuator.

9. The optical system of claim 5 wherein the bulk receiver optic is characterized by a focal plane opposite the field, the aperture layer is coincident the focal plane, and each lens in the plurality of lenses is a collimating lens characterized by a lens focal length and offset from the focal plane of the bulk receiver optic by the lens focal length.

10. The optical system of claim 1 wherein each of the lasers in the plurality of lasers comprises a vertical-cavity surface-emitting laser (VCSEL) and each of the plurality of pixels comprises a plurality of single-photon avalanche diode (SPAD) detectors configured to receive light from a corresponding one of the plurality of lasers.

11. The optical system of claim 10 wherein each VCSEL laser outputs an illuminating beam of an initial diameter that is substantially identical to or slightly greater than a diameter of a corresponding aperture in the aperture layer.

12. The optical system of claim 1 wherein the aperture layer comprises a thin opaque structure arranged along a focal plane of the bulk receiver optic and each aperture in the plurality of apertures constrains the field of view of its corresponding pixel such that the pixel retains relatively high spatial selectivity.

13. The optical system of claim 1 wherein the illumination source is arranged along a focal plane of the bulk transmitting optic such that each illuminating beam projected from the bulk transmitting optic into the field ahead of the system is substantially the same size and geometry as the field of view of a corresponding input channel at any distance from the system.

14. The optical system of claim 1 wherein the optical imaging transmit module can selectively project illuminating beams into a field ahead of the system according to an illumination pattern that substantially matches, in size and geometry across a range of distances from the system, the fields of view of the input channels.

15. The optical system of claim 1 wherein the bulk transmitter optic is adjacent to and laterally offset from the bulk receiver optic.

16. An optical system for performing distance measurements, the optical system comprising:
a laser array including a plurality of lasers, each laser in the plurality of lasers having an operating wavelength and configured to project a discrete illuminating beam in a field ahead of the optical system;
a pixel block including a plurality of pixels;
a bulk receiver optic configured to receive light from the field;
an optical assembly defining a plurality of input channels disposed between the bulk receiver optic and the pixel block, each input channel in the plurality of input channels configured to communicate light from the bulk receiver optic to a pixel in the plurality of pixels, wherein the optical assembly comprises: an aperture layer arranged behind and coincident with a focal plane of the bulk receiver optic and defining a plurality of apertures including one aperture per input channel; a lens layer adjacent the aperture layer opposite the bulk receiver optic, the lens layer comprising a plurality of lenses including an input lens substantially axially aligned with a corresponding aperture for each input channel; and an optical filter between the lens layer and the pixel block and configured to receive light from the plurality of lenses and pass a narrow band of radiation that includes the operating wavelength of the plurality of lasers to the plurality of pixels while blocking radiation outside the band; and
a rotary actuator comprising a rotary electric motor operatively coupled to rotate the plurality of input channels and the bulk receiver optic about a full 360 degree rotation axis of the system.

17. The optical system of claim 16 wherein each input channel includes a pixel having a field of view configured to receive light from a corresponding one of the plurality of lasers and wherein the laser array can selectively project illuminating beams into the field ahead of the system according to an illumination pattern that substantially matches, in size and geometry across a range of distances from the system, the fields of view of the input channels.

18. The optical system of claim 17 wherein the rotary actuator further comprises an optical encoder and wherein the system further comprises circuitry coupled to the rotary actuator to control a rotational speed of the rotary electric motor based on outputs of the optical encoder.

19. The optical system of claim 17 wherein the optical system is configured to execute a plurality of sampling periods during each rotation of the rotary actuator in which the plurality of lasers are activated to project light away from the optical system into fields of view of the input channels, where each sampling period in the plurality of sampling periods is taken at a different arcuate sampling position.

20. The optical system of claim 17 wherein the aperture layer comprises a thin opaque structure arranged along a focal plane of the bulk receiver optic and each aperture constrains the field of view of its corresponding pixel such that the pixel retains relatively high spatial selectivity.

21. The optical system of claim 17 wherein each laser in the plurality of lasers comprises a vertical-cavity surface-emitting laser (VCSEL) and each pixel in the plurality of pixels comprises a plurality of single-photon avalanche diodes (SPADs).

22. An optical system for performing distance measurements, the optical system comprising:
a bulk transmitter optic;
a monolithic laser array including a plurality of vertical-cavity surface-emitting lasers (VCSELs) on a single semiconductor die, wherein each laser in the monolithic laser array is configured to project a discrete beam through the bulk transmitter optic at an operating wavelength into a field ahead of the optical system;
a pixel block including a plurality of pixels, each pixel in the plurality of pixels comprising a plurality of single-photon avalanche diode (SPAD) detectors;
a bulk receiver optic configured to receive light rays emitted by the laser array and reflected from surfaces;
an optical assembly defining a plurality of input channels disposed between the bulk receiver optic and the pixel block, each input channel in the plurality of input channels configured to communicate light from the bulk receiver optic to a pixel in the plurality of pixels, wherein the optical assembly comprises:
an aperture layer arranged behind and coincident with a focal plane of the bulk receiver optic, the aperture layer defining a plurality of discrete apertures of substantially uniform diameter including one aperture per input channel and where adjacent apertures in the plurality of discrete apertures are offset by a pitch distance that is greater than the diameter of each aperture in the plurality of discrete apertures;
a lens layer adjacent the aperture layer opposite the bulk receiver optic, the lens layer comprising a plurality of lenses including an input lens substantially axially aligned with a corresponding aperture for each input channel; and
an optical filter between the lens layer and the pixel block, the optical filter configured to receive light from the plurality of lenses and pass a narrow band of radiation that includes the operating wavelength of the plurality of lasers to the plurality of pixels while blocking radiation outside the band; and
a rotary actuator comprising a rotary electric motor operatively coupled to rotate the plurality of input channels and the bulk receiver optic about a full 360 degree rotation axis of the system.

23. The optical system of claim 22 wherein the aperture layer comprises a thin opaque structure and each aperture in the plurality of apertures constrains the field of view of its corresponding pixel such that the pixel retains relatively high spatial selectivity.

24. The optical system of claim 22 wherein the optical system is configured to execute a plurality of sampling periods during each rotation of the rotary actuator where each sampling period in the plurality of sampling periods is taken at a different arcuate sampling position and wherein the signal processing circuit is configured to count incident photons for the plurality of pixels within each sampling period.

25. The optical system of claim 24 wherein the monolithic laser array is two-dimensional, wherein the pixel block is arranged in a two dimensional array, and wherein the optical system further comprises a signal processing circuit connected to the pixel block and configured to reconstruct a three-dimensional representation of a field ahead of the optical system using positions of the pixels and the lasers in the two dimensional arrays.

26. The optical system of claim 22 wherein the plurality of pixels in the pixel block are arranged in a two-dimensional array that includes a plurality of columns of pixels with each pixel in a given column being offset from an adjacent pixel in the given column by a first pixel pitch and wherein each column of pixels is horizontally offset from an adjacent column of pixels by the first pixel pitch and vertically offset from the adjacent column by a second pixel pitch.

27. The optical system of claim 22 wherein the plurality of lasers are arranged along a focal plane of the bulk transmitting optic and are configured to selectively project illuminating beams into a field ahead of the system according to an illumination pattern that substantially matches, in size and geometry across a range of distances from the system, the fields of view of the input channels, wherein each illuminating beam projected from the bulk transmitting optic into the field ahead of the system is substantially the same size and geometry of the field of view of a corresponding input channel at any distance from the system.

\* \* \* \* \*